US012764687B2

(12) United States Patent
Lee et al.

(10) Patent No.: US 12,764,687 B2
(45) Date of Patent: Oct. 13, 2026

(54) METHOD OF PERFORMING SYNCHRONIZATION AND FREQUENCY OFFSET ESTIMATION USING ISI CONSIDERED REFERENCE SIGNAL AND RECEIVER PERFORMING THE SAME

(71) Applicant: Samsung Electronics Co., Ltd., Suwon-si (KR)

(72) Inventors: Jinyong Lee, Suwon-si (KR); Jungwoon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 355 days.

(21) Appl. No.: 18/532,219

(22) Filed: Dec. 7, 2023

(65) Prior Publication Data

US 2024/0259970 A1 Aug. 1, 2024

(30) Foreign Application Priority Data

Jan. 27, 2023 (KR) ........................ 10-2023-0010817

(51) Int. Cl.
*H04W 56/00* (2009.01)
*H04L 5/00* (2006.01)
*H04L 27/20* (2006.01)

(52) U.S. Cl.
CPC ....... *H04W 56/0015* (2013.01); *H04L 5/0051* (2013.01); *H04L 27/2017* (2013.01); *H04W 56/0035* (2013.01)

(58) Field of Classification Search
CPC ......... H04W 56/0015; H04W 56/0035; H04W 56/005; H04L 5/0051; H04L 27/2017; H04L 2027/0065; H04L 27/16; H04L 27/10; H04L 27/1563; H04L 2027/0026; H04L 27/0014; H04L 27/14; H04L 27/2657; H04L 27/2695; H04B 17/21
See application file for complete search history.

(56) References Cited

U.S. PATENT DOCUMENTS

| | | | |
|---|---|---|---|
| 7,039,132 B1 | 5/2006 | Chen et al. | |
| 7,277,504 B2 | 10/2007 | Smit | |
| 7,697,895 B2 | 4/2010 | Grundvig et al. | |
| 8,411,797 B2 | 4/2013 | Suissa et al. | |
| 9,722,845 B2 | 8/2017 | Lu et al. | |
| 10,015,029 B2 | 7/2018 | Chu et al. | |
| 10,575,267 B2 | 2/2020 | Kwon et al. | |
| 2006/0014494 A1* | 1/2006 | Vanderperren | H04L 27/2675 455/295 |
| 2017/0223648 A1* | 8/2017 | Shin | H04W 56/005 |

FOREIGN PATENT DOCUMENTS

| | | | |
|---|---|---|---|
| EP | 4002785 A1 | 5/2022 | |
| KR | 102233243 B1 | 3/2021 | |
| WO | WO-2005081484 A1 * | 9/2005 | H04L 27/0014 |

* cited by examiner

*Primary Examiner* — Thai Nguyen
(74) *Attorney, Agent, or Firm* — Harness, Dickey & Pierce, P.L.C.

(57) ABSTRACT

A method of performing synchronization and frequency offset estimation for an input signal includes receiving an input signal through a wireless channel, and performing a frequency compensation operation on the input signal based on a reference signal to generate a compensated input signal. The reference signal corresponds to an access code associated with the input signal. The method includes determining a synchronization timing and a frequency offset for the input signal by comparing the reference signal with the compensated input signal.

20 Claims, 21 Drawing Sheets

FIG. 5A

| MODE | CODE LENGTH | GFSK BT | GFSK INDEX |
|---|---|---|---|
| BR | 64 | 0.5 | 0.28~0.35 |
| LE | 32 | 0.5 | 0.45~0.55 |

FIG. 5C

| SYMBOL INDEX (n) | 0 | ±1 | ±2 |
|---|---|---|---|
| RATIO | 0.7886 | 0.1057 | ~0 |

FIG. 5D

| $C_{ref}(n)$ | $C_{ACC}(n-1)$ | $C_{ACC}(n)$ | $C_{ACC}(n+1)$ |
|---|---|---|---|
| -1.0000 | 0 | 0 | 0 |
| -0.7886 | 0 | 0 | 1 |
| 0.5772 | 0 | 1 | 0 |
| 0.7886 | 0 | 1 | 1 |
| -0.7886 | 1 | 0 | 0 |
| -0.5772 | 1 | 0 | 1 |
| 0.7886 | 1 | 1 | 0 |
| 1.0000 | 1 | 1 | 1 |

FIG. 11A

| REFERENCE | $R_1$ | $R_2$ | $R_3(=\pi/2)$ |
|---|---|---|---|
| SIZE | 37 | 50 | 64 |

FIG. 11B

```
if (C_ACC(n − 1) == 0)
    if (C_ACC(n) == 0)
        if (C_ACC(n + 1) == 0
            C_ref(n) = −R_3
        else
            C_ref(n) = −R_2
    else
        if (C_ACC(n) == 0)
            C_ref(n) = R_1
        else
            C_ref(n) = R_2
else
    if (C_ACC(n) == 0)
        if (C_ACC(n + 1) == 0
            C_ref(n) = −R_2
        else
            C_ref(n) = −R_1
    else
        if (C_ACC(n) == 0)
            C_ref(n) = R_2
        else
            C_ref(n) = R_3
```

Est. Fo = 103.5 kHz

300

METHOD OF PERFORMING SYNCHRONIZATION AND FREQUENCY OFFSET ESTIMATION USING ISI CONSIDERED REFERENCE SIGNAL AND RECEIVER PERFORMING THE SAME

CROSS-REFERENCE TO RELATED APPLICATION

This application claims priority under 35 USC § 119 to Korean Patent Application No. 10-2023-0010817 filed on Jan. 27, 2023 in the Korean Intellectual Property Office (KIPO), the contents of which are herein incorporated by reference in their entirety.

FIELD

Some example embodiments relate generally to semiconductor integrated circuits, including methods of performing synchronization and frequency offset estimation using inter-symbol interference (ISI) considered reference signals, and receivers configured to perform the methods.

BACKGROUND

Frequency shift keying (FSK) is a modulation technique to transmit digital signals via a radio channel. It is related to analog frequency modulation and is insensitive to interference. Gaussian FSK is an FSK method with an upstream Gaussian filter. This flattens the steep edges of digital signals, which means that the high frequency components of the signal are reduced or eliminated. As a result, less bandwidth is may be desirable or required for the transmission of the signal. The Gaussian filter has the advantage of reducing sideband power, and reducing interference with neighboring channels, but at the cost of increasing inter-symbol interference (ISI).

Wireless technologies for communication between devices are increasing in order to enable the Internet of things (IoT) and communication between communication devices. Bluetooth is a wireless technology standard for exchanging data typically over short distances between fixed and mobile devices and personal area networks (PANs). Bluetooth operates at frequencies in the globally unlicensed industrial, scientific and medical (ISM) 2.4 GHz short-range radio frequency band. Bluetooth uses a modulated radio technology of GFSK.

SUMMARY

At least one example embodiment of the inventive concepts provides a method of performing synchronization and frequency offset estimation capable of efficiently detecting synchronization timing and determining frequency offset using a reference signal considering ISI characteristics.

At least one example embodiment of the inventive concepts provides a receiver that is included in a wireless communication system and performs the method.

According to some example embodiments, a method of performing synchronization and frequency offset estimation for an input signal includes receiving an input signal through a wireless channel, performing a frequency compensation operation on the input signal based on a reference signal to generate a compensated input signal, the reference signal corresponding to an access code associated with the input signal, and determining a synchronization timing and a frequency offset for the input signal by comparing the reference signal with the compensated input signal.

According to some example embodiments, a receiver device includes a calculator configured to, receive an input signal through a wireless channel, perform a frequency compensation operation on the input signal based on a reference signal to generate a compensated input signal, the reference signal corresponding to an access code associated with the input signal, and calculate a symbol error of the input signal by comparing the reference signal with the compensated input signal. The receiver device includes a detector configured to determine a synchronization timing and a frequency offset for the input signal based on the symbol error of the input signal.

According to some example embodiments, a method of performing synchronization and frequency offset estimation for an input signal includes generating a reference signal based on an access code, the reference signal obtained by reflecting inter-symbol interference (ISI) characteristics, receiving an input signal through a wireless channel, the input signal modulated by a Gaussian frequency shift keying (GFSK) scheme, calculating a frequency error of the input signal based on the reference signal, performing a frequency compensation operation on the input signal based on the frequency error of the input signal, calculating a symbol error of the input signal by comparing the input signal with the reference signa, and determining a synchronization timing and a frequency offset for the input signal based on the symbol error of the input signal. Generating the reference signal includes analyzing patterns of a plurality of symbols included in the access code, calculating ISI components of the access code based on the patterns of the plurality of symbols, and obtaining the reference signal including the ISI components. Calculating the frequency error of the input signal and performing the frequency compensation operation are performed in real-time while receiving the input signal. Determining the synchronization timing and the frequency offset for the input signal includes comparing the symbol error of the input signal with a threshold value, and comparing the symbol error of the input signal with a minimum error. The synchronization timing and frequency offset are updated when the symbol error of the input signal is greater than the threshold value and when the symbol error of the input signal is smaller than the minimum error.

In the method of performing synchronization and frequency offset estimation and the receiver according to some example embodiments, the reference signal may be generated by reflecting the characteristics of the modulated signal modulated by the GFSK scheme, e.g., by reflecting the ISI characteristics of the modulated signal. In addition, the frequency error of the input signal may be measured, tracked, monitored and compensated in real-time using the reference signal, thereby efficiently determining the synchronization timing and providing the initial frequency offset. Accordingly, the synchronization performance and the signal reception performance may be improved or enhanced in any environment regardless of various states of the wireless channel.

BRIEF DESCRIPTION OF THE DRAWINGS

Illustrative, non-limiting example embodiments will be more clearly understood from the following detailed description taken in conjunction with the accompanying drawings.

FIGS. 5A, 5B, 5C and 5D are diagrams for describing an operation of FIG. 4.

FIGS. 11A, 11B, 12A, 12B and 13 are diagrams for describing a configuration and an effect of a method of performing synchronization and frequency offset estimation according to some example embodiments.

DETAILED DESCRIPTION

Figure 1:
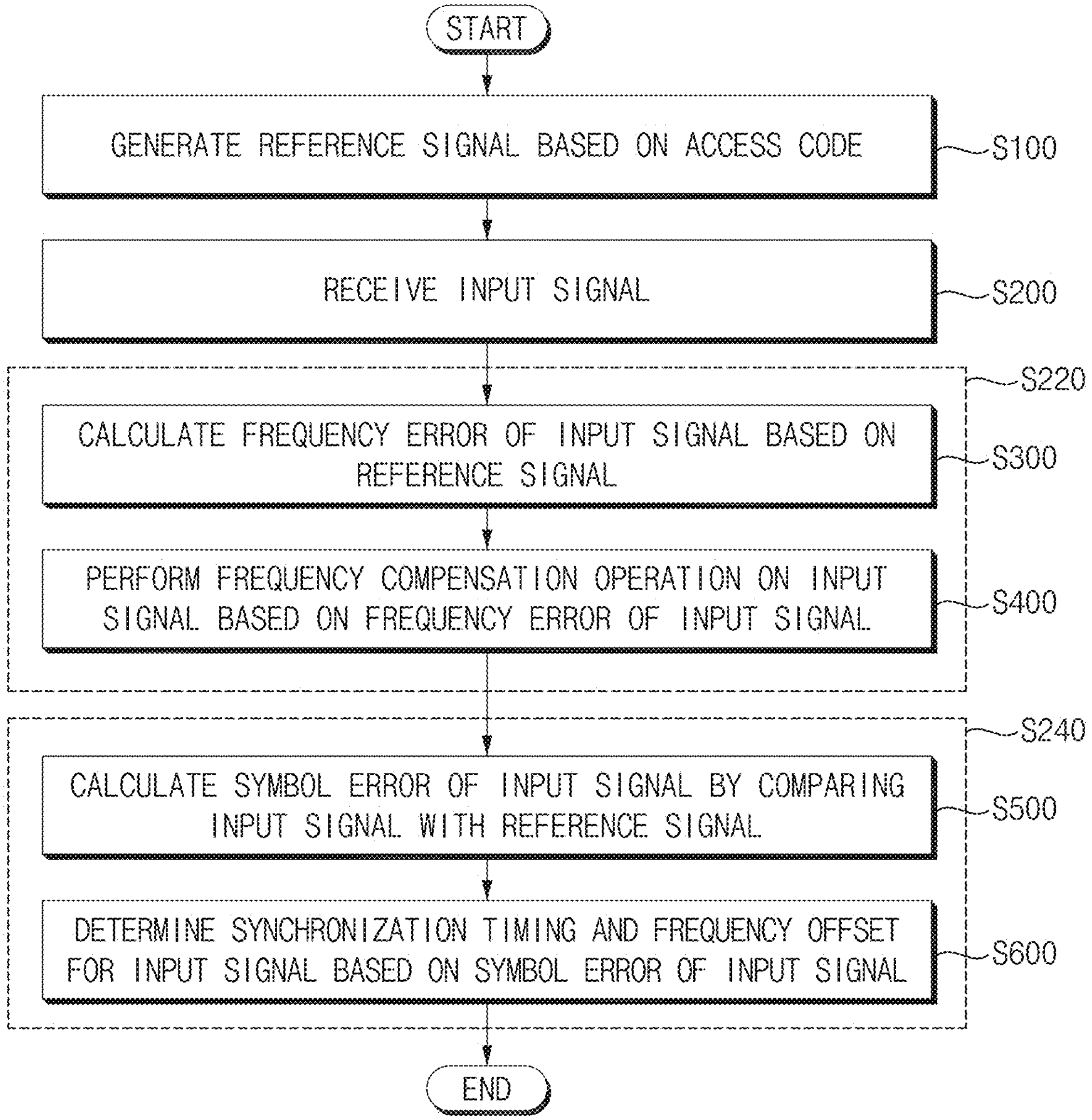
FIG. 1 is a flowchart illustrating a method of performing synchronization and frequency offset estimation according to some example embodiments.

Various example embodiments will be described more fully with reference to the accompanying drawings, in which some example embodiments are shown. The inventive concepts may, however, be embodied in many different forms and should not be construed as in limited to the example embodiments set forth herein. Like reference numerals refer to like elements throughout this application.

FIG. 1 is a flowchart illustrating a method of performing synchronization and frequency offset estimation according to some example embodiments.

Referring to FIG. 1, a method of performing synchronization and frequency offset estimation according to some example embodiments is performed by a receiver that receives an input signal from a transmitter in a wireless communication system. Detailed configurations of the receiver and a wireless communication system including the receiver will be described with reference to FIG. 2.

In the method of performing synchronization and frequency offset estimation according to some example embodiments, a reference signal is generated based on an access code (or access signal) (operation S100). The reference signal is obtained by reflecting inter-symbol interference (ISI) characteristics. For example, the access code may be used for a synchronization of signal transmission between the transmitter and the receiver in the wireless communication system, and may include a plurality of symbols (or a plurality of bits). The access code may be referred to as a training sequence. For example, the reference signal may include a plurality of reference symbols that correspond to the plurality of symbols included in the access code. The reference signal including ISI components depending on a symbol configuration (or bit configuration) of the access signal may be utilized according to some example embodiments, and thus the accuracy of detection may be improved or enhanced. Operation S100 will be described with reference to FIGS. 4, 5A, 5B, 5C and 5D.

In some example embodiments, the access code may be received from the outside or an external device (e.g., from the transmitter in the wireless communication system) through the wireless channel when operation S100 is performed. For example, the access code may be transmitted through an upper layer (e.g., through media access control (MAC)).

In some example embodiments, the access code may be pre-stored in a storage unit included in the receiver, and may be called, loaded or read from the storage unit when operation S100 is performed. For example, the access code may be included in a codebook stored in the storage unit.

In some example embodiments, the operation of receiving the access code from the outside or calling the access code from the internal storage unit for the execution of S100 and the operation of generating the reference signal in S100 may be performed separately (or independently) from an operation of receiving an input signal for the synchronization between the transmitter and the receiver in S200. In addition, the operation of receiving the access code from the outside or calling the access code from the internal storage unit and the operation of generating the reference signal may be completed before S200 begins.

In some example embodiments, when the access code is determined or selected, the reference signal may be automatically determined, and thus the operation of generating the reference signal in S100 may be omitted after being performed for the first time without being performed whenever the communication is performed. For example, when the access code is stored (or listed up) in the form of a codebook in the storage unit, the reference signal may also be stored (or listed up) in the form of a codebook in the storage unit to correspond to the access code. In some example embodiments, when the access code is determined, subsequent operations described below may be performed by calling or reading the reference signal from the storage unit. An example embodiment where S100 is omitted will be described with reference to FIG. 10A.

The input signal is received through the wireless channel between the transmitter and the receiver (operation S200). The input signal may be referred to as a received signal or a reception signal. For example, the input signal may correspond to the access code, may include a plurality of symbols (e.g., a plurality of input symbols or a plurality of received symbols) identical or substantially identical to the plurality of symbols included in the access code, and may be used for the synchronization of signal transmission between the transmitter and the receiver. For example, the input signal transmitted from the transmitter to the receiver may be a signal modulated by Gaussian frequency shift keying (GFSK) scheme.

A frequency compensation (or correction or calibration) operation is performed on the input signal based on the reference signal (operation S220).

For example, a frequency error of the input signal is calculated based on the reference signal (operation S300), and the frequency compensation operation is performed on the input signal based on the frequency error of the input signal (operation S400). For example, the operation of calculating the frequency error of the input signal in S300 and the operation of performing the frequency compensation operation in S400 may be performed in real-time (or during runtime) while the input signal is receiving.

A synchronization timing and a frequency offset for the input signal are determined by comparing the reference signal with a compensated input signal on which the frequency compensation operation is performed (operation S240).

For example, a symbol error (or bit error) of the input signal is calculated by comparing the input signal with the reference signal (operation S500). For example, differences between the symbols (or bits) of the access code used to generate the reference signal in S100 and the symbols (or bits) of the input signal received in S200 may be calculated.

In some example embodiments, the symbol error of the input signal may be obtained based on a hard decision scheme in which the number of error symbols different from the symbols of the access code among the symbols of the input signal is counted.

In some example embodiments, the symbol error of the input signal may be obtained based on a soft decision scheme in which a difference (or similarity) between the symbols of the input signal and the symbols of the access code is output in the form of specific information using a specific function.

The synchronization timing and frequency offset for the input signal may be determined based on the symbol error of the input signal (operation S600). For example, the synchronization timing and frequency offset for the input signal may be determined substantially simultaneously or concurrently. Operation S600 will be described with reference to FIGS. 6, 7 and 8.

The communication between the transmitter and the receiver included in the wireless communication system may be performed based on the synchronization timing and the frequency offset determined by S600.

In some example embodiments, the wireless communication system may be a wireless communication system implemented based on a differential phase shift keying (DPSK). For example, the wireless communication system may be a Bluetooth system, but example embodiments are not limited thereto.

In a general or conventional wireless communication system that performs DPSK-based modulation, a frequency offset estimation is performed based on a zero-crossing scheme. When the zero-crossing scheme is used, a relatively good frequency offset estimation result may be obtained with a relatively simple computational complexity and hardware structure. However, when the zero-crossing scheme is used, the synchronization performance may become worse than the data detection performance in many cases, and thus the degraded synchronization performance may affect the overall system performance. In addition, when the frequency offset increases, the number of zero-crossings may be limited due to the nature of the algorithm, and thus it may be difficult to accurately estimate the initial frequency offset.

In the method of performing synchronization and frequency offset estimation according to some example embodiments, the reference signal may be generated by reflecting the characteristics of the modulated signal modulated by the GFSK scheme, e.g., by reflecting the ISI characteristics of the modulated signal. In addition, the frequency error of the input signal may be measured, tracked, monitored and compensated in real-time using the reference signal, thereby efficiently determining the synchronization timing and providing the initial frequency offset. Accordingly, the synchronization performance and the signal reception performance may be improved or enhanced in any environment regardless of various states of the wireless channel.

Figure 2:
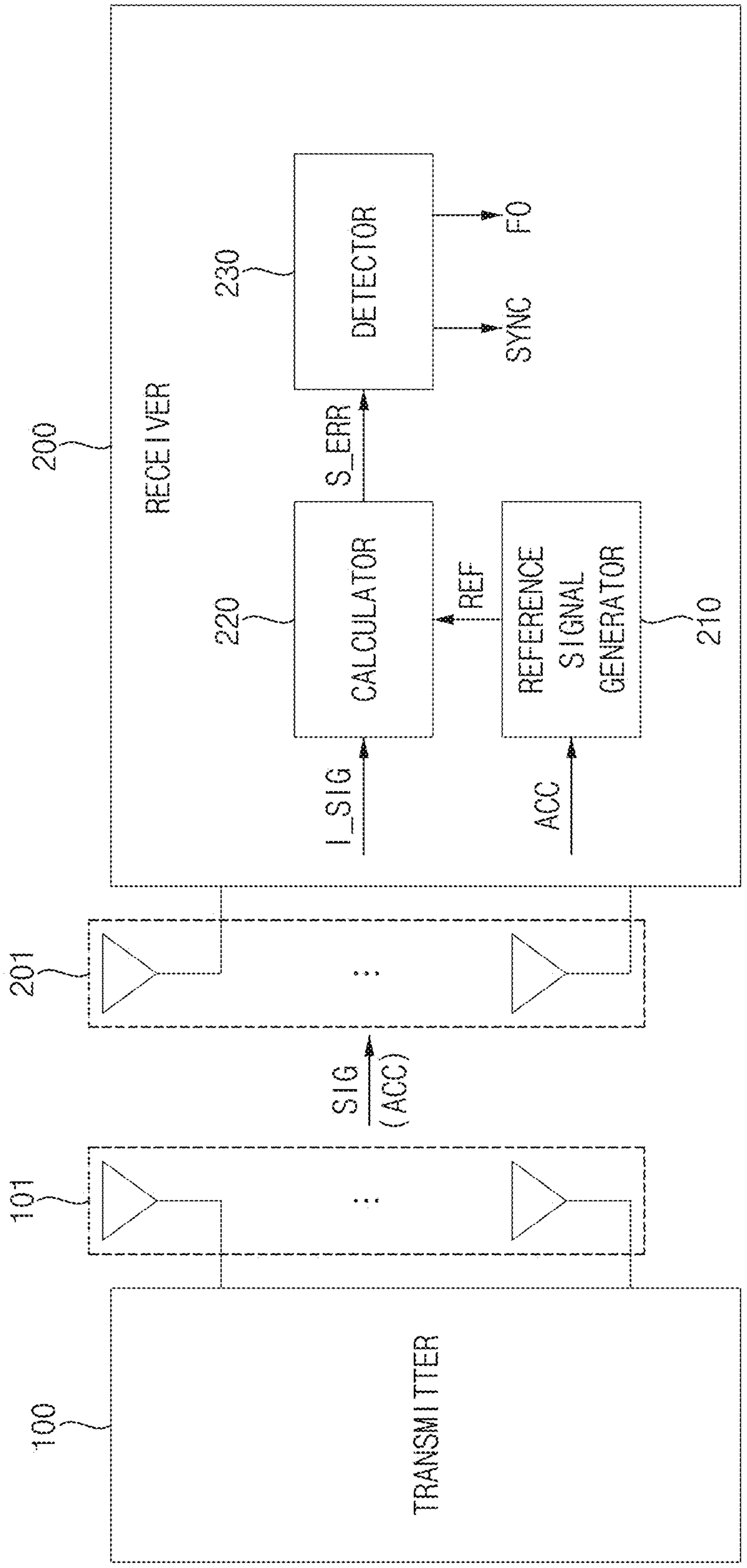
FIG. 2 is a block diagram illustrating a receiver and a wireless communication system including the receiver according to some example embodiments.

FIG. 2 is a block diagram illustrating a receiver and a wireless communication system including the receiver according to some example embodiments.

Referring to FIG. 2, a wireless communication system 10 includes a transmitter 100 and a receiver 200. The wireless communication system 10 may further include a channel (e.g., a wireless channel) formed as a signal transmission path between the transmitter 100 and the receiver 200.

In some example embodiments, the wireless communication system 10 may be a DPSK-based wireless communication system. For example, the wireless communication system 10 may be a Bluetooth system. For example, the Bluetooth system may be implemented based on the Institute of Electrical and Electronics Engineers (IEEE) 802.15 standard.

Bluetooth is a short-range wireless technology standard that is used for exchanging data between fixed and mobile devices over short distances and building personal area networks (PANs). Bluetooth is sometimes used as an alternative to wired connections, to exchange files between nearby portable devices and connect cell phones and music players with wireless headphones. Bluetooth operates at frequencies in the globally unlicensed industrial, scientific and medical (ISM) 2.4 GHz short-range radio frequency band and is implemented based on GFSK scheme. Bluetooth divides transmitted data into frames, and transmits each frame on one of 79 designated Bluetooth channels. Each channel has a bandwidth of one megahertz (MHz).

In the Bluetooth system, the performance of the system may be improved or enhanced when the synchronization timing and the frequency offset for the input signal are accurately and efficiently detected at an initial operation time.

Hereinafter, operations of the wireless communication system 10 and the receiver 200 according to some example embodiments will be described with a focus on operation of detecting the synchronization timing and the frequency offset for the input signal at the initial operation time. However, example embodiments are not limited thereto. After detecting the synchronization timing and the frequency offset, the wireless communication system 10 may perform a normal signal (or data) transmission based on the detected synchronization timing and the detected frequency offset.

In addition, hereinafter, some example embodiments will be described with a focus on the Bluetooth system. However, example embodiments are not limited thereto, and some example embodiments may be applied or employed to at least one of various wireless communication systems that perform the operation of detecting the synchronization timing and the frequency offset for the input signal at the initial operation time.

The transmitter 100 transmits a signal SIG used to detect the synchronization timing and the frequency offset. For example, the signal SIG may be provided in the form of a packet, and may correspond to an access code or a training sequence. In some example embodiments, the transmitter 100 may transmit an access code ACC and/or information associated with (or related to) the access code ACC before the signal SIG is transmitted. For example, the access code ACC may be transmitted through an upper layer.

The transmitter 100 may include a plurality of antennas (or transmission antennas) 101. The transmitter 100 may transmit or output the signal SIG or the access code ACC using the plurality of antennas 101.

The receiver 200 receives an input signal I_SIG corresponding to the signal SIG from the transmitter 100 through the channel, and detects the synchronization timing and the frequency offset based on the input signal I_SIG. In some example embodiments, the receiver 200 may additionally receive the access code ACC transmitted from the transmitter 100.

For example, the receiver 200 may generate a reference signal REF by reflecting ISI characteristics based on the access code ACC, may calculate a frequency error of the input signal I_SIG based on the reference signal REF, may perform a frequency compensation operation on the input signal I_SIG based on the frequency error of the input signal I_SIG, may calculate a symbol error S_ERR of the input signal I_SIG by comparing the input signal I_SIG with the reference signal REF, and may determine a synchronization timing SYNC and a frequency offset FO for the input signal I_SIG based on a result of the symbol error S_ERR of the input signal I_SIG.

The receiver 200 includes a reference signal generator 210, a calculator 220 and a detector 230. The receiver 200 may further include a plurality of antennas (or reception antennas) 201.

The receiver 200 may receive the input signal I_SIG from the transmitter 100 through the channel using the plurality of antennas 201. As described above, the channel (e.g., wireless channel) may be formed between the plurality of antennas 101 of the transmitter 100 and the plurality of antennas 201 of the receiver 200.

The reference signal generator 210 may generate the reference signal REF by reflecting the ISI characteristics based on the access code ACC that is received from the transmitter 100 or internally stored in the receiver 200. In other words, the reference signal generator 210 may perform operation S100 in FIG. 1. In some example embodiments, the reference signal generator 210 may be omitted as will be described with reference to FIG. 10B.

The calculator 220 may receive the input signal I_SIG, may calculate the frequency error of the input signal I_SIG based on the reference signal REF, may perform the frequency compensation operation on the input signal I_SIG based on the frequency error of the input signal I_SIG, and may calculate the symbol error S_ERR of the input signal I_SIG by comparing the input signal I_SIG with the reference signal REF. In other words, the calculator 220 may perform operations S200, S300, S400 and S500 in FIG. 1.

The detector 230 may determine the synchronization timing SYNC and the frequency offset FO for the input signal I_SIG based on the symbol error S_ERR of the input signal I_SIG. In other words, the detector 230 may perform operation S600 in FIG. 1.

Detailed configurations of the reference signal generator 210 and the calculator 220 will be described with reference to FIGS. 9A, 9B, 9C and 9D.

A wireless communication system may provide an access code or a training sequence for the synchronization process, and a reference signal corresponding to the access code or the training sequence may be used for the synchronization process. Since the size of the signal delay component corresponding to the ISI characteristics is relatively large, the reference signal may be greatly influenced by the pattern of the access code or the training sequence. When a fixed training sequence is provided, a fixed reference signal may frequently or always be used. In contrast, when a variable access code depending on a signal is provided, it may be desirable or necessary to use a reference signal suitable or appropriate for the pattern of the access code.

In the method of performing synchronization and frequency offset estimation and the receiver according to some example embodiments, the reference signal REF considering or reflecting modulation characteristics (e.g., the ISI characteristics) may be generated, and thus the reference signal REF may be a variable signal depending on the variable access code. In addition, the synchronization timing may be determined and the initial frequency offset may be calculated using the reference signal REF implemented in consideration of the ISI characteristics. For example, the synchronization timing may be determined by tracking the similarity between the input signal I_SIG and the reference signal REF over time, and the initial frequency offset may be provided using the frequency error of the corresponding timing.

Figure 3:
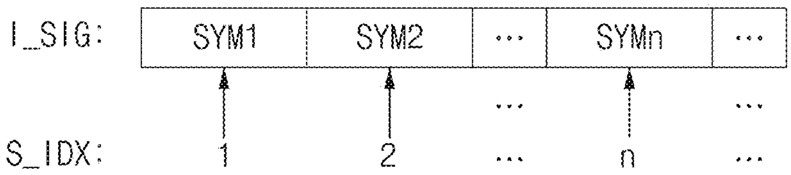
FIG. 3 is a diagram for describing an operation of a receiver and a wireless communication system according to some example embodiments.

FIG. 3 is a diagram for describing an operation of a receiver and a wireless communication system according to some example embodiments.

Referring to FIG. 3, configuration and processing in a time domain of the input signal I_SIG received by the receiver 200 is illustrated. For example, the input signal I_SIG may include a plurality of symbols SYM1, SYM2, . . . , SYMn, and may include a plurality of symbol indices S_IDX associated with the plurality of symbols SYM1 to SYMn. For example, the plurality of symbols SYM1 to SYMn included in the input signal I_SIG may be substantially the same as the plurality of symbols included in the access code. For example, the plurality of symbol indices S_IDX may include a first symbol index "1" associated with the first symbol SYM1, a second symbol index "2" associated with the second symbol SYM2, and an n-th symbol index "n" associated with the n-th symbol SYMn. The symbol indices S_IDX may be referred to as time indices.

Operations S300, S400, S500 and S600 in FIG. 1 may be performed on each of the plurality of symbol indexes S_IDX (e.g., each of the plurality of symbols SYM1 to SYMn). For example, the frequency error calculation, the frequency compensation, the symbol error calculation, and the synchronization timing and the frequency offset determination may be performed on the input signal I_SIG with respect to time point at which the first symbol SYM1 is received. Thereafter, the frequency error calculation, the frequency compensation, the symbol error calculation, and the synchronization timing and the frequency offset determination may be performed on the input signal I_SIG with respect to time point at which the second symbol SYM2 is received. Similarly, the frequency error calculation, the frequency compensation, the symbol error calculation, and the synchronization timing and the frequency offset determination may be performed on the input signal I_SIG with respect to time point at which the n-th symbol SYMn is received.

However, example embodiments are not limited thereto. For example, a sampling operation may be performed by periodically setting sample indices on the input signal I_SIG, and operations S300, S400, S500 and S600 in FIG. 1 may be performed on each of the sample indices. For example, at a first time point, a first sampling value may be obtained by sampling the input signal I_SIG, a first sample index (e.g., "1") for the first sampling value may be obtained, and the frequency error calculation, the frequency compensation, the symbol error calculation, and the synchronization timing and the frequency offset determination may be performed on the first sampling value. Thereafter, at a second time point elapsed by a sampling interval from the first time point, a second sampling value may be obtained by sampling the input signal I_SIG, a second sample index (e.g., "2") for the second sampling value may be obtained, and the frequency error calculation, the frequency compensation, the symbol error calculation, and the synchronization timing and the frequency offset determination may be performed on the second sampling value. Similarly, at an n-th time point, an n-th sampling value may be obtained by sampling the input signal I_SIG, an n-th sample index (e.g., "n") for the n-th sampling value may be obtained, and the frequency error calculation, the frequency compensation, the symbol error calculation, and the synchronization timing and the frequency offset determination may be performed on the n-th sampling value. For example, the sample indices may be obtained by oversampling the input signal I_SIG. The sample indices may also be referred to as time indices.

Figure 4:
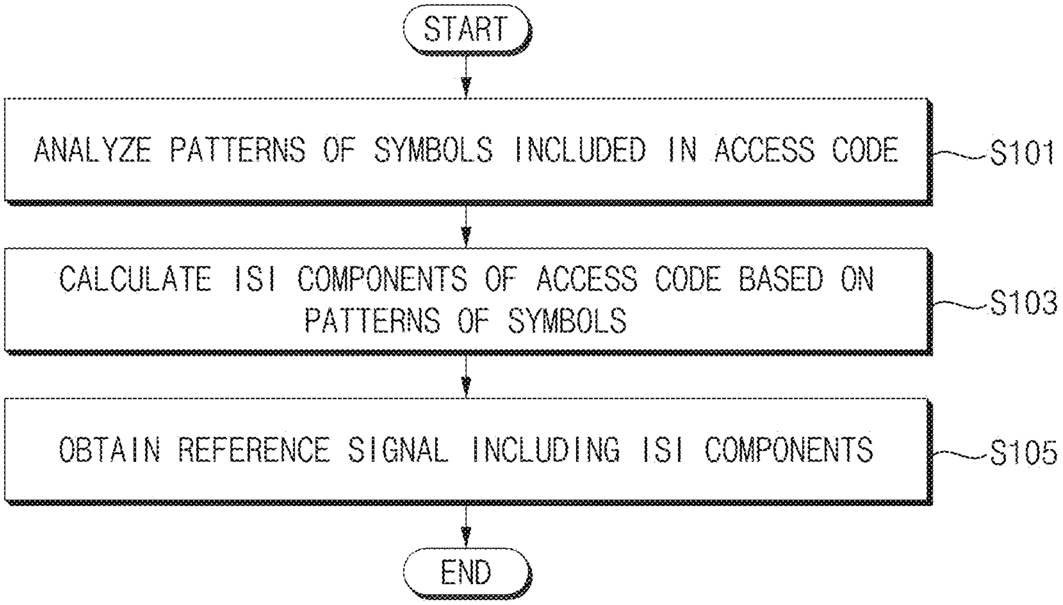
FIG. 4 is a flowchart illustrating an example of generating a reference signal in FIG. 1.

FIG. 4 is a flowchart illustrating an example of generating a reference signal in FIG. 1. FIGS. 5A, 5B, 5C and 5D are diagrams for describing an operation of FIG. 4.

Referring to FIGS. 1, 4, 5A, 5B, 5C and 5D, the reference signal REF considering the modulation characteristics (e.g., the ISI characteristics) may be generated and formed.

For example, in generating the reference signal (operation S100), patterns of a plurality of symbols included in the access code may be analyzed (operation S101), calculating ISI components of the access code may be calculated based on the patterns of the plurality of symbols (operation S103), and the reference signal including the ISI components may be obtained (operation S105). For example, when the plurality of symbols included in the access code include a first symbol, a second symbol arranged immediately before the first symbol, and a third symbol arranged immediately after the first symbol, and when the reference signal includes a first reference symbol corresponding to the first symbol among the plurality of symbols, the first reference symbol may be generated based on the first symbol, the second symbol and the third symbol. For example, a length of the reference signal may be shorter than a length of the access code.

Hereinafter, the process of generating and forming the reference signal REF will be described based on the Bluetooth system.

A signal transmitted in the Bluetooth system may be modulated by the GFSK scheme. In the GFSK scheme, an ISI component having a relationship to a bandwidth-time product or bandwidth-bit period product (BT) value may be generated due to a characteristic of Gaussian filter or Gaussian impulse response. The bandwidth-time product is obtained by $BT=B*T_b$, where 'B' is the 3 dB bandwidth of the Gaussian filter and '$T_b$' is the bit period.

FIG. 5A illustrates GFSK parameters and a length of an access code depending on operation modes defined in the Bluetooth standard. 'BR' represents a basic rate mode and 'LE' represents a low energy mode. In the basic rate mode and the low energy mode, the length of the access code, the BT value and the index value may be implemented as illustrated in FIG. 5A. In the Bluetooth standard, the BT value may be fixed to 0.5 regardless of the operation modes, and thus the ISI components may be calculated based thereon.

Figure 5B:
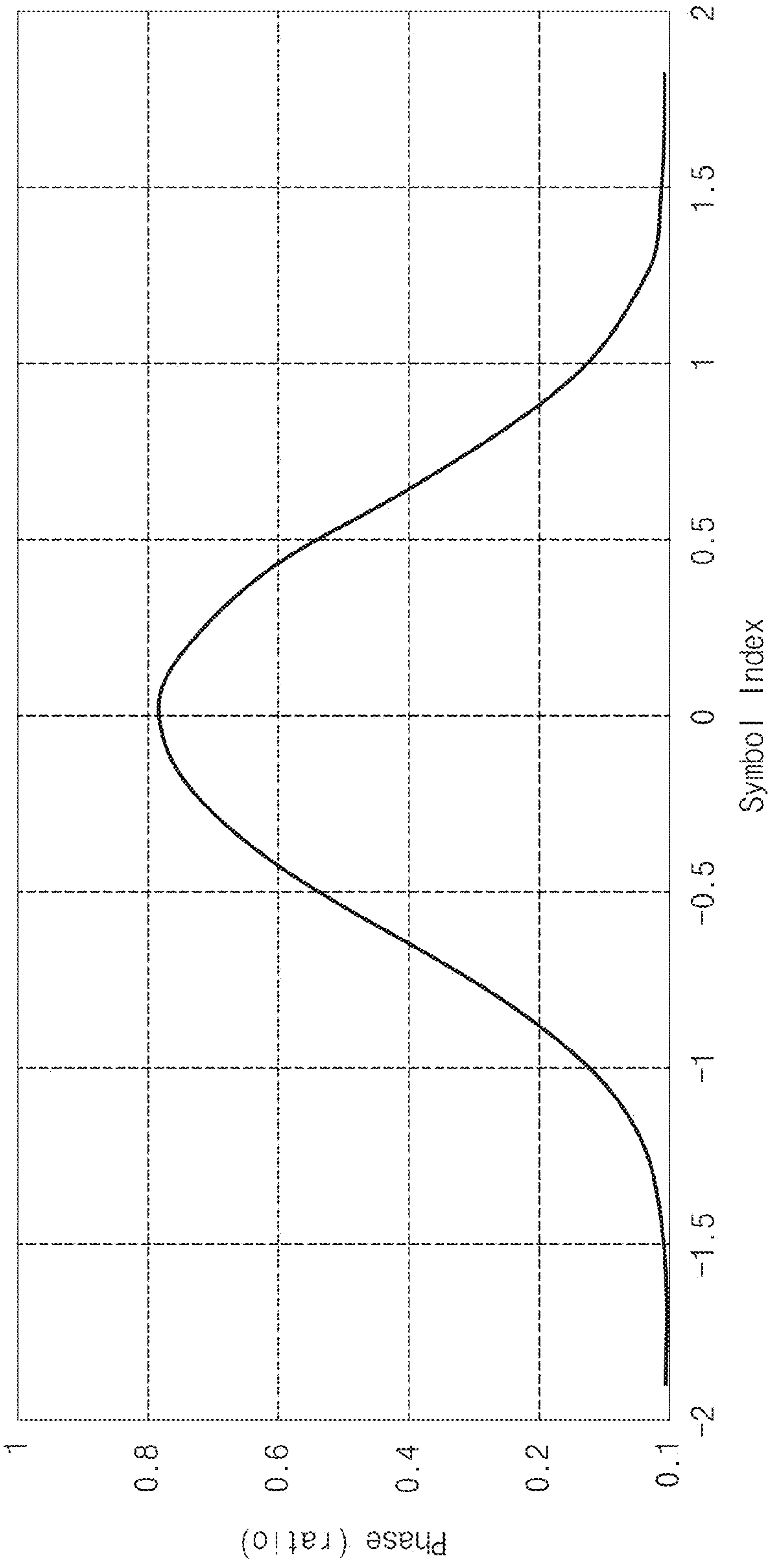

FIG. 5B illustrates an example of signal propagation distribution by the GFSK modulation when the BT value is 0.5, and FIG. 5C illustrates a result of FIG. 5B as a table. When a specific symbol value corresponding to a specific symbol index is received, an immediately preceding symbol value corresponding to an immediately preceding symbol index arranged immediately before the specific symbol index and an immediately following symbol value corresponding to an immediately following symbol index arranged immediately after the specific symbol index may affect the ISI components. For example, let X−1, X and X+1 be symbol values corresponding to symbol indices n−1, n and n+1. A received value Y obtained when the symbol value X is received may have a value corresponding to 0.1057*(X−1)+0.7886*X+0.1057*(X+1).

FIG. 5D illustrates an example of generating a reference signal $C_{ref}$ using an access code $C_{ACC}$. The reference signal may be determined by a type of the access code transmitted from the upper layer. When the length of the access code is L, the reference signal may have a length of L−2 (n=1, 2, . . . , L−2). $C_{ref}(n)$ denotes a reference symbol value included in the reference signal and corresponding to the symbol index n, and $C_{ACC}(n-1)$, $C_{ACC}(n)$ and $C_{ACC}(n+1)$ denote symbol values included in the access code and corresponding to the symbol indices n−1, n and n+1. The $C_{ref}(n)$ value may correspond to an example where the BT value is 0.5. For actual application, it may be desirable or required to scale the $C_{ref}(n)$ value to a value suitable for the system, and to adjust the $C_{ref}(n)$ value with registers for optimization.

As described above, when the signal modulated by the GFSK scheme is received, the ISI components included in the reference signal may be generated depending on the BT characteristics by the Gaussian filter. The reference symbol value corresponding to the current symbol may be obtained using the current symbol, the immediately preceding symbol (or previous symbol) and the immediately following symbol (or next symbol).

Figure 6:
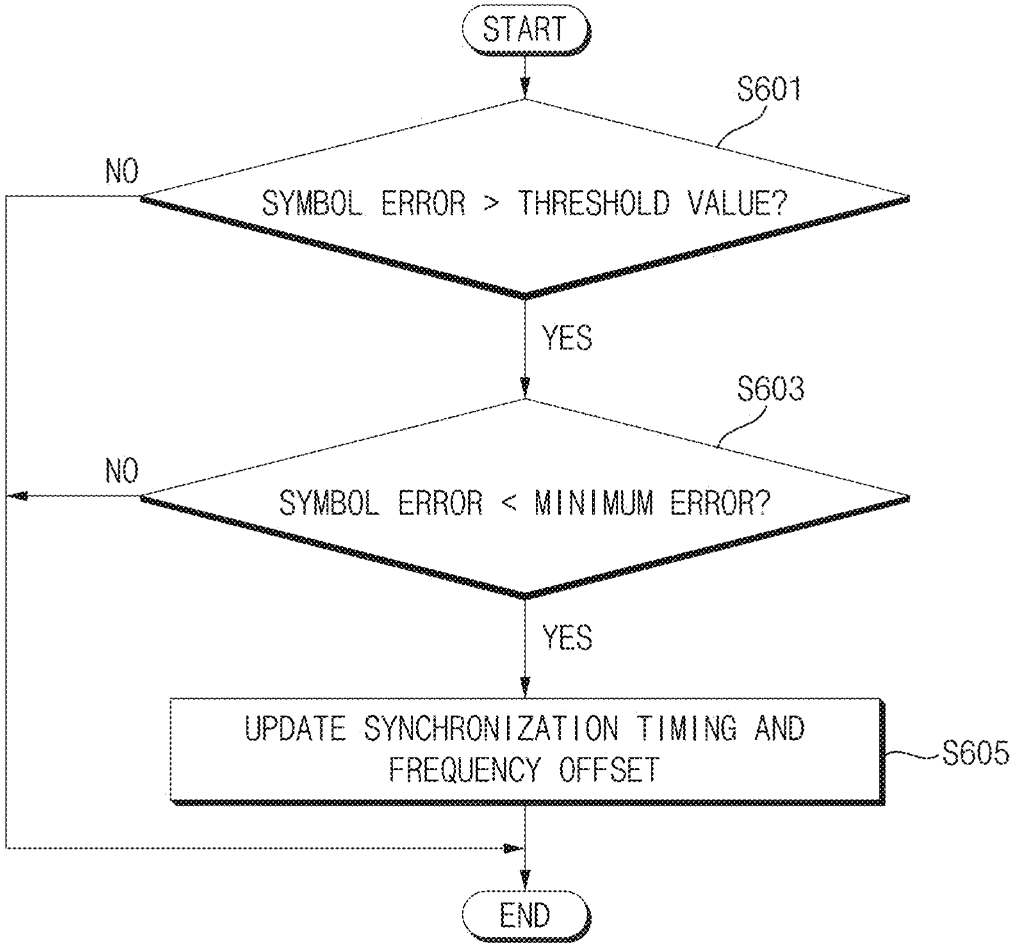
FIG. 6 is a flowchart illustrating an example of determining a synchronization timing and a frequency offset for an input signal in FIG. 1.

FIG. 6 is a flowchart illustrating an example of determining a synchronization timing and a frequency offset for an input signal in FIG. 1.

Referring to FIGS. 1 and 6, in determining the synchronization timing and the frequency offset for the input signal (operation S600), the symbol error of the input signal may be compared with a threshold value (operation S601), and the symbol error of the input signal may be compared with the minimum error (operation S603).

When the symbol error of the input signal is greater than the threshold value (operation S601: YES), and when the symbol error of the input signal is smaller than the minimum error (operation S603: YES), the synchronization timing and the frequency offset may be updated (operation S605). For example, a time point with the smallest symbol error may be set as the synchronization timing, and the frequency offset at the corresponding time point may be obtained.

When the symbol error of the input signal is smaller than or equal to the threshold value (operation S601: NO), or when the symbol error of the input signal is greater than or equal to the minimum error (operation S603: NO), the synchronization timing and the frequency offset may not be updated and the process may be terminated.

Figure 7:
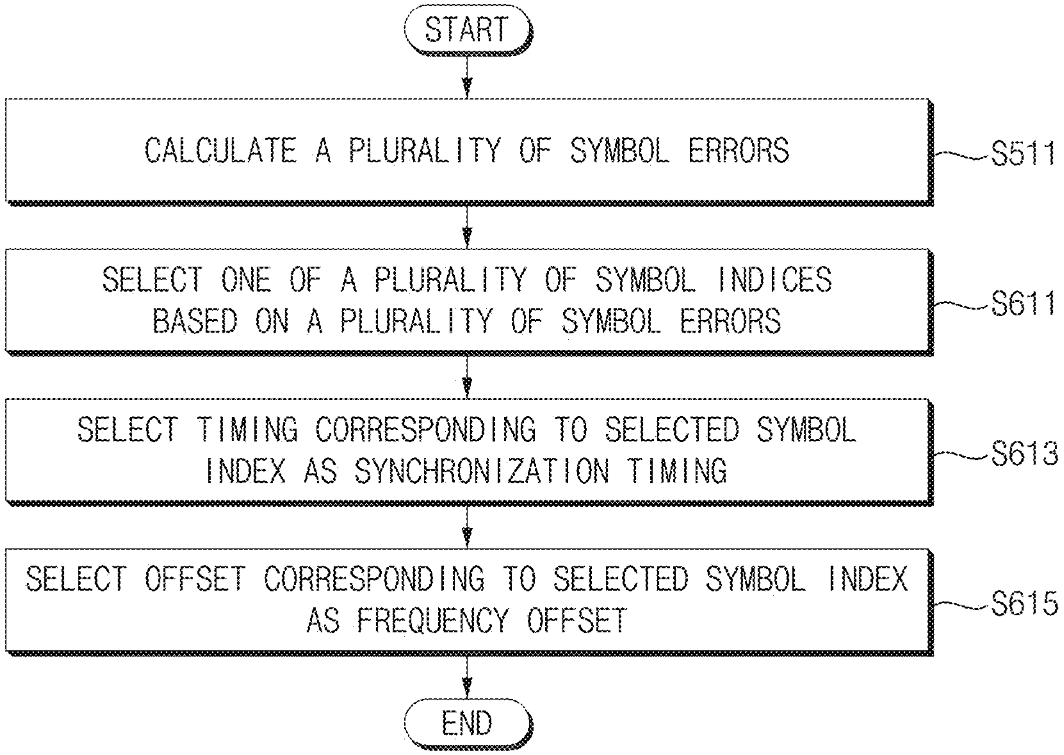
FIG. 7 is a flowchart illustrating an example of calculating a symbol error of an input signal, and an example of determining a synchronization timing and a frequency offset for an input signal in FIG. 1.

FIG. 7 is a flowchart illustrating an example of calculating a symbol error of an input signal, and an example of determining a synchronization timing and a frequency offset for an input signal in FIG. 1.

Referring to FIGS. 1 and 7, the input signal I_SIG may include the plurality of symbols SYM1 to SYMn, and may include the plurality of symbol indices S_IDX associated with the plurality of symbols SYM1 to SYMn, as described with reference to FIG. 3.

In calculating the symbol error of the input signal (operation S500), a plurality of symbol errors may be calculated for the plurality of symbol indexes S_IDX (operation S511). For example, a first symbol error may be calculated for the first symbol index "1", a second symbol error may be calculated for the second symbol index "2", and an n-th symbol error may be calculated for the n-th symbol index "n".

In some example embodiments, the symbol error, which represents the difference between the input signal and the reference signal, may be calculated or inferred based on various algorithms, such as a matched filtering, the size of a mean square error (MSE), or the like.

In determining the synchronization timing and the frequency offset for the input signal (operation S600), one of the plurality of symbol indices may be selected based on the plurality of symbol errors (operation S611), a timing corresponding to the selected symbol index may be selected as the synchronization timing (operation S613), and an offset corresponding to the selected symbol index may be selected as the frequency offset (operation S615).

In some example embodiments, a symbol error corresponding to the selected symbol index may be the smallest symbol error among the plurality of symbol errors. In other words, as with that described with reference to FIG. 6, a time point with the smallest symbol error may be set as the synchronization timing, and the frequency offset at the corresponding time point may be obtained.

Although example embodiments are described that operations S511, S611, S613 and S615 are performed using the symbol indices, example embodiments are not limited thereto. For example, operations S511, S611, S613 and S615 may be performed using the sample indices described with reference to FIG. 3. The symbol indices and/or the sample indices sequentially arranged by lapse of time may be referred to as time indices.

In the method of performing synchronization and frequency offset estimation and the receiver according to some example embodiments, the synchronization timing may be determined for the time index with the smallest or minimum symbol error. In addition, the frequency error calculated using the reference signal configured by reflecting the ISI characteristics may be monitored depending on the time indices, and the initial frequency offset may be provided by converting a value corresponding to the synchronization timing into an offset.

Figure 8:
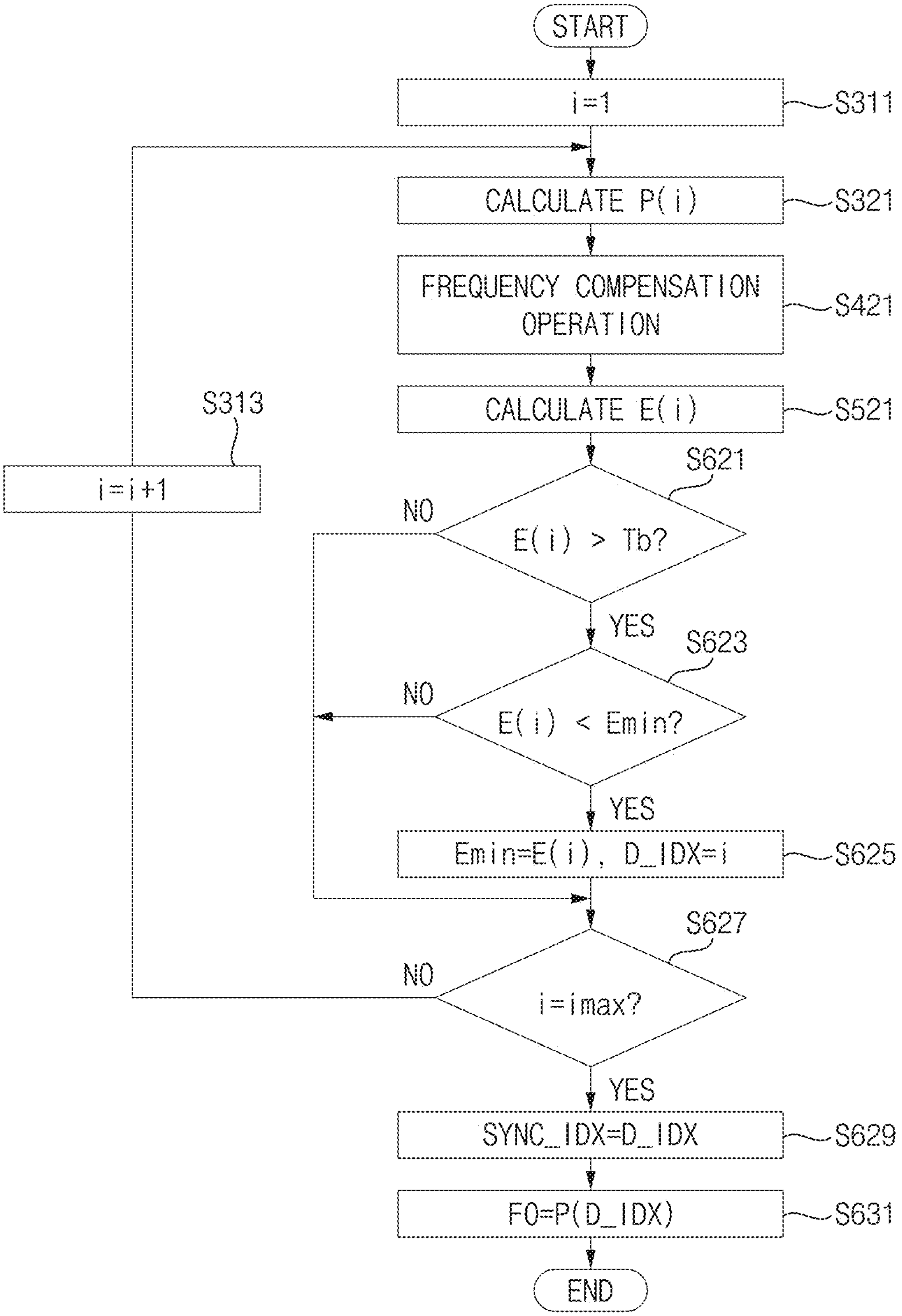
FIG. 8 is a flowchart illustrating an example of calculating a frequency error of an input signal, an example of performing a frequency compensation operation on an input signal, an example of calculating a symbol error of an input signal, and an example of determining a synchronization timing and a frequency offset for an input signal in FIG. 1.

FIG. 8 is a flowchart illustrating an example of calculating a frequency error of an input signal, an example of performing a frequency compensation operation on an input signal, an example of calculating a symbol error of an input signal, and an example of determining a synchronization timing and a frequency offset for an input signal in FIG. 1. The descriptions repeated with FIGS. 6 and 7 will be omitted.

Referring to FIGS. 1 and 8, a process of the frequency error calculation, the frequency compensation, the symbol error calculation, and the synchronization timing and the frequency offset determination on an i-th time index is illustrated.

For example, at an initial operation time, "i" may be set to zero (operation S311).

In calculating the frequency error of the input signal (operation S300), an i-th frequency error P(i) of the i-th time index may be calculated (operation S321).

In performing the frequency compensation operation on the input signal (operation S400), the frequency compensation operation may be performed based on the i-th frequency error P(i) (operation S421).

In calculating the symbol error of the input signal (operation S500), an i-th symbol error E(i) may be calculated for the i-th time index (operation S521).

In determining the synchronization timing and the frequency offset for the input signal (operation S600), when the i-th symbol error E(i) is greater than a threshold value Tb (operation S621: YES), and when the i-th symbol error E(i) is smaller than the minimum error Emin (operation S623: YES), the minimum error Emin may be updated to the i-th symbol error E(i), and a detection index D_IDX corresponding to the minimum error Emin may be updated to "i" (operation S625). When the i-th symbol error E(i) is smaller than or equal to the threshold value Tb (operation S621: NO), or when the i-th symbol error E(i) is greater than or equal to the minimum error Emin (operation S623: NO), operation S625 may be omitted.

When "i" is less than the maximum value imax (operation S627: NO), "i" may be increased by one (operation S313), and operations S321, S421, S521, S621, S623 and S625 may be repeatedly performed.

When "i" is equal to the maximum value imax (operation S627: YES), e.g., when the calculations and operations are completely performed on all time indices, the detection index D_IDX corresponding to the minimum error Emin may be determined as a synchronization timing index SYNC_IDX corresponding to the synchronization timing SYNC (operation S629). In addition, a frequency error P(D_IDX) corresponding to the detection index D_IDX corresponding to the minimum error Emin may be determined as the frequency offset FO (operation S631).

In some example embodiments, the synchronization detection may be performed in two steps. For example, a process of determining whether the input signal matches the access code (or training sequence) by processing the input signal based on the symbol index and a process of detecting a matching time may be performed. In the method of performing synchronization and frequency offset estimation and the receiver according to some example embodiments, the accuracy of the process of determining whether the input signal matches the access signal may be improved or enhanced. For example, the frequency difference component may be calculated using the reference signal generated by considering the GFSK modulation characteristics, and the synchronization timing may be determined by the real-time compensation of the received signal.

In some example embodiments, the reference signal $C_{ref}(n)$ considering the ISI components of the modulation signal may be generated based on the pattern of the access code. If a difference between the reference signal $C_{ref}(n)$ and a phase signal y (n) corresponding to the received signal in symbol units is defined as p(n), the phase difference p(n) may reflect the frequency offset component and may be obtained based on Equation 1.

$$p(n) = \frac{1}{L}\sum_{m=1}^{L-2}(y(n+m) - C_{ref}(m)) \quad \text{[Equation 1]}$$

The phase difference p(n) may correspond to the frequency error calculated in S300 of FIG. 1. In other words, in Equation 1, p(n) denotes the frequency error of the input signal, L denotes the length of the access code, y(n+m) denotes the input signal, $C_{ref}(m)$ denotes the reference signal, and n denotes the symbol index.

The received signal may be compensated from the phase difference calculated based on Equation 1, and then the access code may be detected. For example, the symbol error calculated in S500 of FIG. 1 may be obtained based on Equation 2, and the time index corresponding to the synchronization timing obtained in S600 of FIG. 1 may be obtained based on Equation 3.

$$d(n) = \sum_{m=0}^{M-1} (\mathrm{abs}(\mathrm{sign}(y(n+m) - p(n)) - C_{ACC}(m))) \quad \text{[Equation 2]}$$

$$SyncFlag = \arg(d(n) = 0) \text{ for } n \in \text{Preamble} \quad \text{[Equation 3]}$$

In Equation 2, d(n) denotes the symbol error, y(n+m) denotes the input signal, p(n) denotes the frequency error, $C_{ACC}(m)$ denotes a symbol value of the access code, and n denotes the symbol index. In Equation 3, SyncFlag denotes the time index corresponding to the synchronization timing. In addition, sign(.) denotes a function obtaining a sign, abs(.) denotes a function obtaining an absolute value, and arg(d (n)=0) denotes a function that returns "n" such that d(n) has a zero value or the minimum value close to zero.

The differences of some example embodiments compared to a conventional method may be that the frequency error is tracked in real-time from the processed reference signal, and may be that the value corresponding to the synchronization timing is determined as the initial frequency offset estimation value. To implement the above-described differences, an additional block for generating the reference signal may be desirable or required for some example embodiments compared to the conventional method.

Figure 9A:
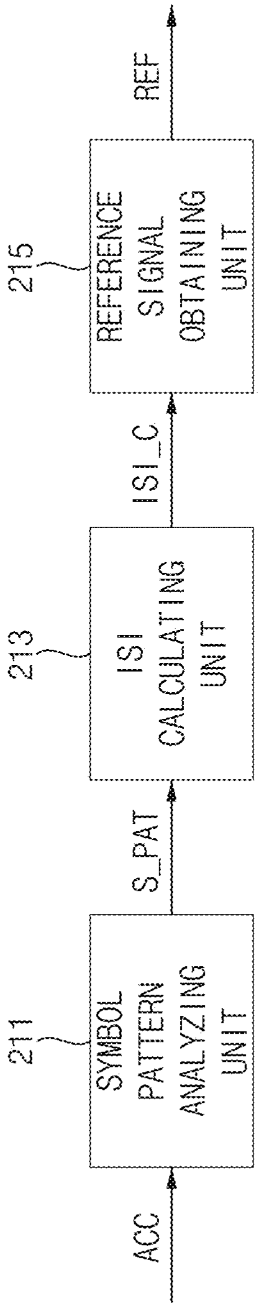
FIGS. 9A and 9B are block diagrams illustrating examples of a reference signal generator included in a receiver of FIG. 2.
Figure 9B:
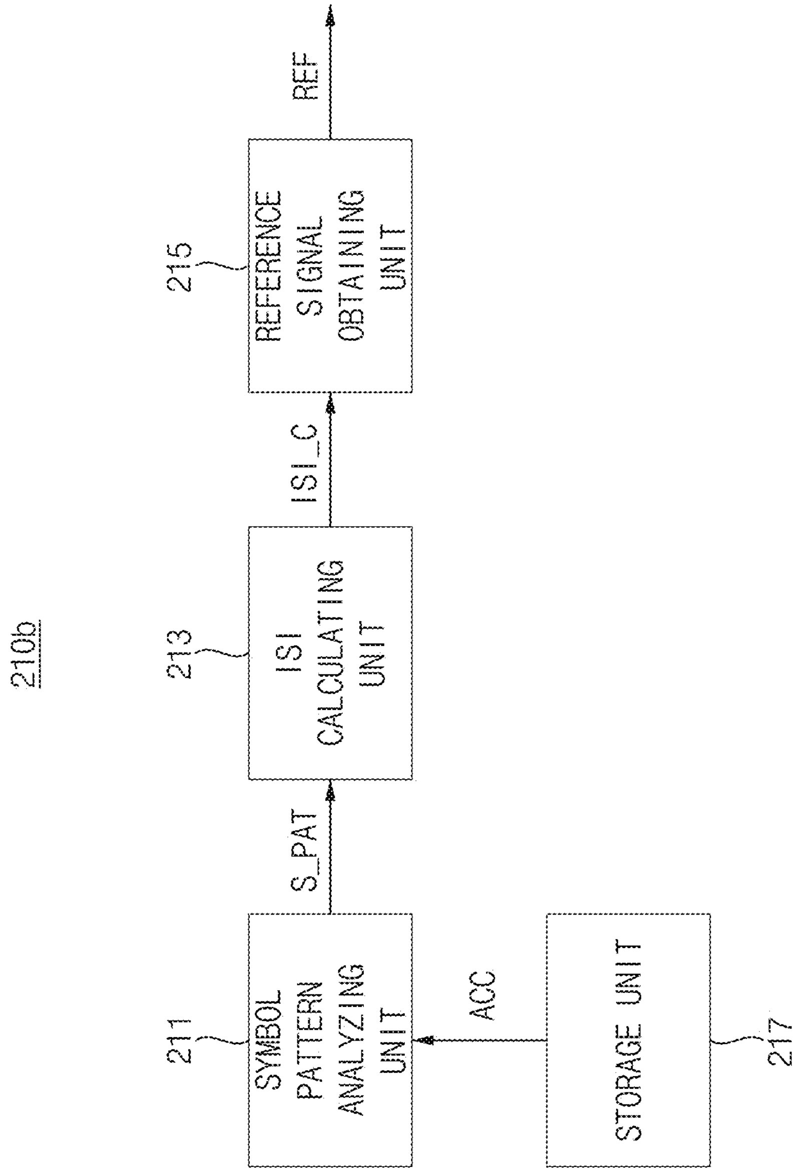

FIGS. 9A and 9B are block diagrams illustrating examples of a reference signal generator included in a receiver of FIG. 2.

Referring to FIG. 9A, a reference signal generator 210*a* may include a symbol pattern analyzing unit 211, an ISI calculating unit 213 and a reference signal obtaining unit 215. FIG. 9A illustrates an example where the access code ACC is provided from the outside of the receiver 200 (e.g., from the transmitter 100).

The symbol pattern analyzing unit 211 may analyze patterns of a plurality of symbols included in the access code ACC, and may generate a symbol pattern signal S_PAT representing the patterns of the plurality of symbols.

The ISI calculating unit 213 may calculate ISI components of the access code ACC based on the patterns of the plurality of symbols (e.g., based on the symbol pattern signal S_PAT), and may generate an ISI signal ISI_C representing the ISI components of the access code ACC.

The reference signal obtaining unit 215 may obtain the reference signal REF including the ISI components of the access code ACC based on the ISI signal ISI_C.

Referring to FIG. 9B, a reference signal generator 210*b* may include a symbol pattern analyzing unit 211, an ISI calculating unit 213, a reference signal obtaining unit 215 and a storage unit 217. FIG. 9B illustrates an example where the access code ACC is provided from the inside of the receiver 200 (e.g., from the storage unit 217). The descriptions repeated with FIG. 9A will be omitted.

The storage unit 217 may store and output the access code ACC. For example, the storage unit 217 may include at least one of various volatile memories and/or various nonvolatile memories. For example, the access code ACC may be stored (or listed up) in the form of the codebook. For example, the access code ACC associated with the input signal I_SIG may be determined before the input signal I_SIG is received, and the access code ACC corresponding to the input signal I_SIG may be called or read from the storage unit 217 when the input signal I_SIG is received.

Figure 9C:
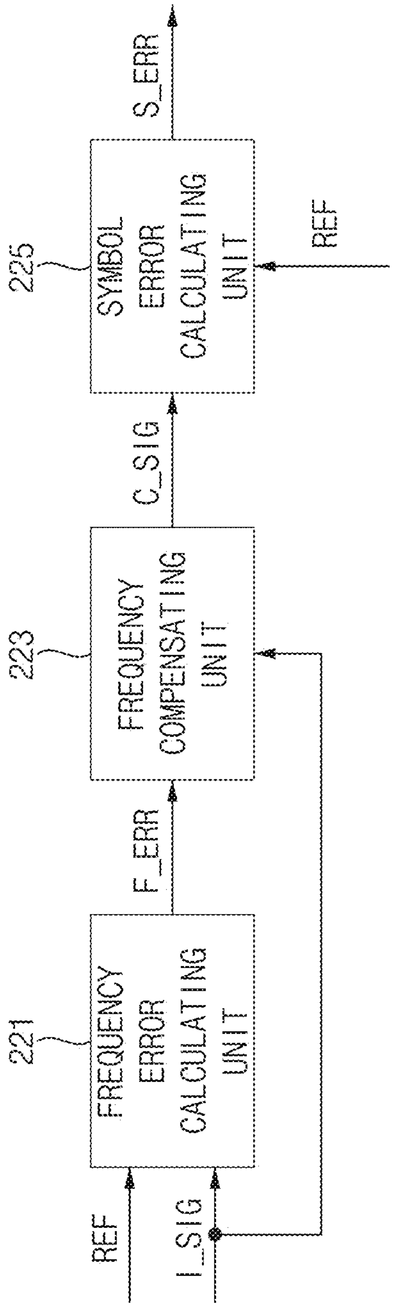
FIGS. 9C and 9D are block diagrams illustrating examples of a calculator included in a receiver of FIG. 2.
Figure 9D:
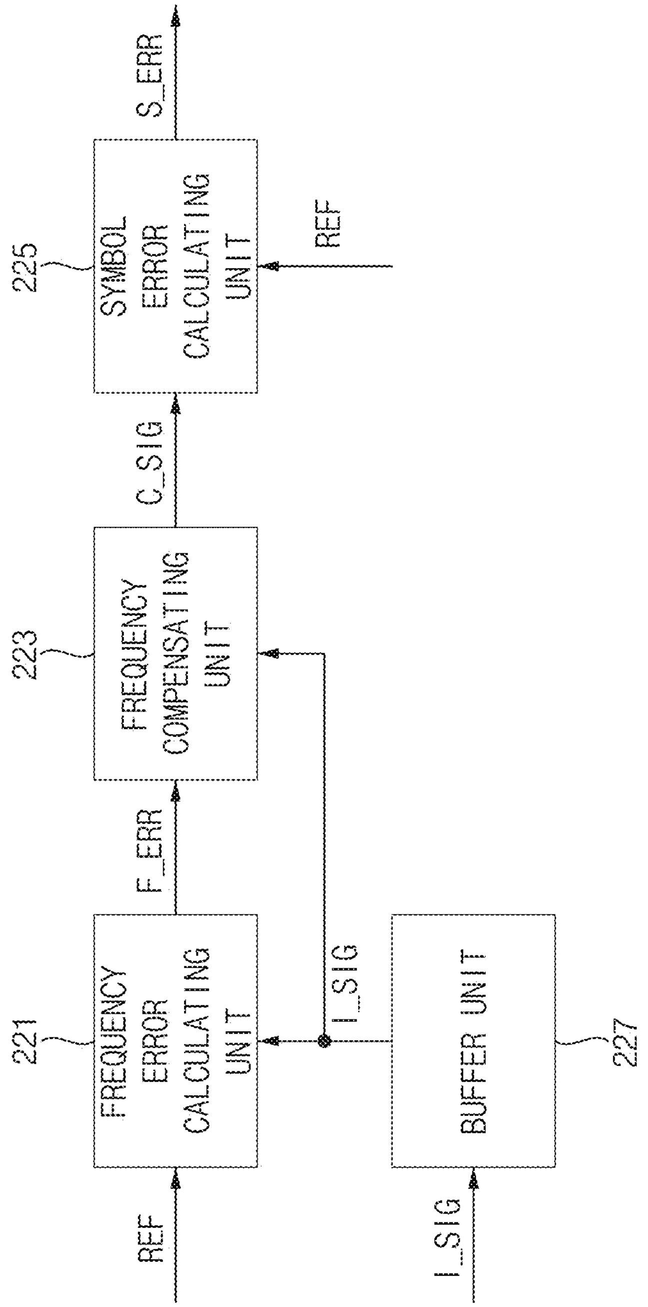

FIGS. 9C and 9D are block diagrams illustrating examples of a calculator included in a receiver of FIG. 2.

Referring to FIG. 9C, a calculator 220*a* may include a frequency error calculating unit 221, a frequency compensating unit 223 and a symbol error calculating unit 225.

The frequency error calculating unit 221 may calculate a frequency error F_ERR of the input signal I_SIG based on the reference signal REF.

The frequency compensating unit 223 may perform the frequency compensation operation on the input signal I_SIG based on the frequency error F_ERR of the input signal I_SIG, and may output a compensated input signal C_SIG on which the frequency compensation operation is performed.

The symbol error calculating unit 225 may calculate a symbol error S_ERR of the input signal I_SIG by comparing the reference signal REF with the input signal I_SIG (e.g., the compensated input signal C_SIG).

Referring to FIG. 9D, a calculator 220*b* may include a frequency error calculating unit 221, a frequency compensating unit 223, a symbol error calculating unit 225 and a buffer unit 227. The descriptions repeated with FIG. 9C will be omitted.

The buffer unit 227 may buffer the input signal I_SIG. In other words, the buffer unit 227 may receive, temporarily store, sample and/or output the input signal I_SIG.

In some example embodiments, at least a part of the reference signal generator 210, the calculator 220 and the detector 230 may be implemented as hardware. For example, at least a part of the reference signal generator 210, the calculator 220 and the detector 230 may be included in a computer-based electronic system. In other example embodiments, at least a part of the reference signal generator 210, the calculator 220 and the detector 230 may be implemented as instruction codes or program routines (e.g., a software program). For example, the instruction codes or the program routines may be executed by a computer-based electronic system, and may be stored in any storage device located inside or outside the computer-based electronic system.

Figure 10A:
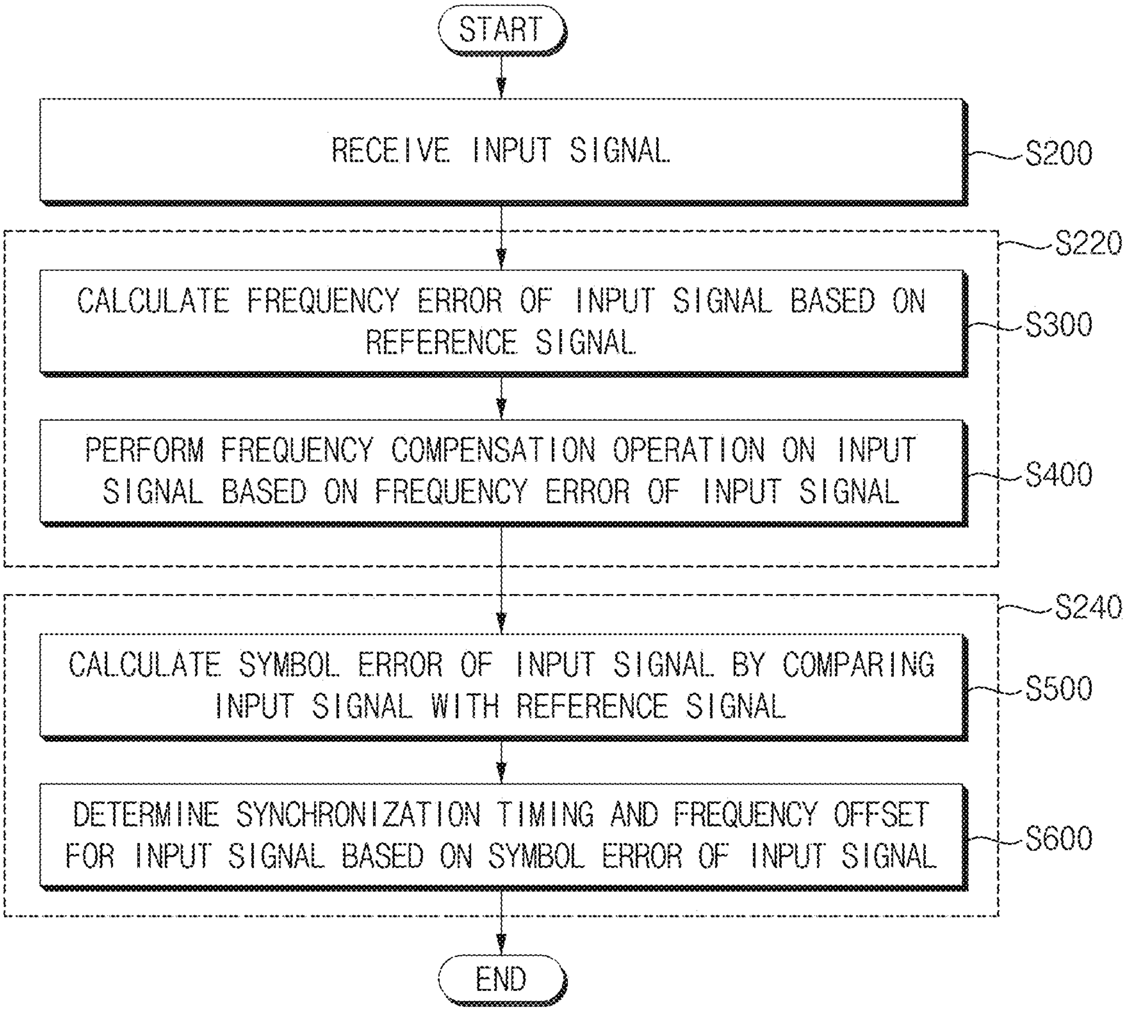
FIG. 10A is a flowchart illustrating a method of performing synchronization and frequency offset estimation according to some example embodiments.

FIG. 10A is a flowchart illustrating a method of performing synchronization and frequency offset estimation according to some example embodiments. The descriptions repeated with FIG. 1 will be omitted.

Referring to FIG. 10A, in a method of performing synchronization and frequency offset estimation according to some example embodiments, the method of FIG. 10A may be substantially the same as the method of FIG. 1, except that S100 is omitted in FIG. 10A.

As described with reference to FIG. 1, the access code and the reference signal corresponding thereto may be stored (or listed up) in the form of the codebook in the storage unit. When the access code is determined, operations S300, S400, S500 and S600 may be performed by calling or reading the reference signal from the storage unit.

Figure 10B:
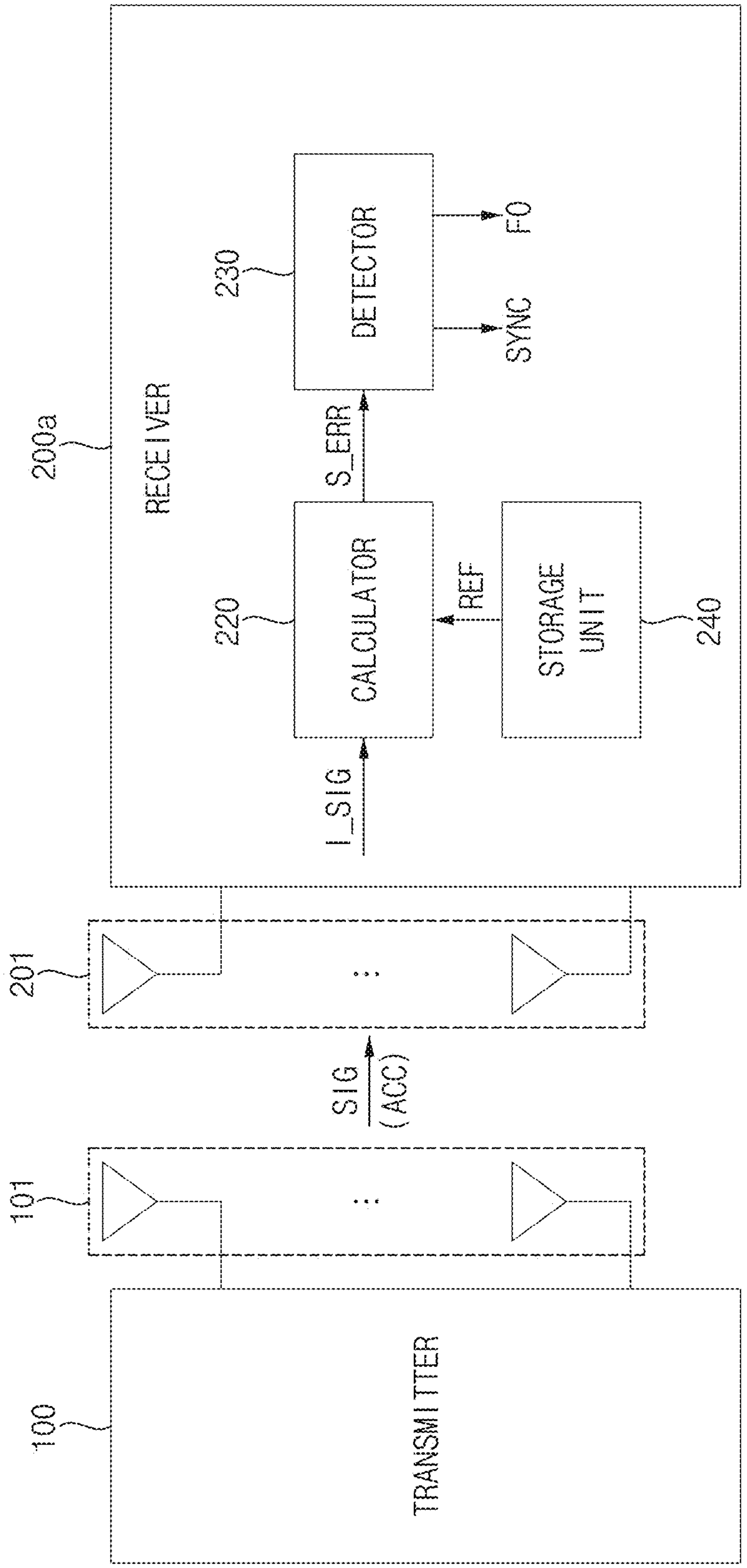
FIG. 10B is a block diagram illustrating a receiver and a wireless communication system including the receiver according to some example embodiments.

FIG. 10B is a block diagram illustrating a receiver and a wireless communication system including the receiver according to some example embodiments. The descriptions repeated with FIG. 2 will be omitted.

Referring to FIG. 10B, a wireless communication system 10*a* includes a transmitter 100 and a receiver 200*a*. The receiver 200*a* includes a storage unit 240, a calculator 220 and a detector 230, and may further include a plurality of antennas 201.

The wireless communication system 10*a* of FIG. 10B may be substantially the same as the wireless communication system 10 of FIG. 2, except that a configuration of the receiver 200*a* is partially changed.

The storage unit 240 may store and output the reference signal REF. Unlike the example of FIG. 2, the reference signal REF corresponding to the access code ACC may be generated in advance and may be stored in advance. For example, the storage unit 240 may include at least one of various volatile memories and/or various nonvolatile memories. For example, the access code ACC and the reference signal REF corresponding thereto may be stored (or listed up) in the form of the codebook. The access code ACC associated with the input signal I_SIG may be determined before the input signal I_SIG is received. When the input signal I_SIG is received, the reference signal REF corresponding to the access code ACC corresponding to the input signal I_SIG may be called or read from the storage unit 240.

FIGS. 11A, 11B, 12A, 12B and 13 are diagrams for describing a configuration and an effect of a method of performing synchronization and frequency offset estimation according to some example embodiments.

Referring to FIGS. 11A and 11B, an example of the reference signal $C_{ref}(n)$ for actual system implementation is illustrated.

For actual hardware configuration and implementation of the system, the size of the reference signal $C_{ref}(n)$ may be adjusted depending on the desired or required resolution. The ISI components of the GFSK modulation of the Bluetooth system may be expressed in three combinations. For example, assuming a resolution of $\pi=128$, the reference signal $C_{ref}(n)$ may be implemented as illustrated in FIG. 11A. The corresponding value may be variable or changeable depending on the modulation characteristics.

FIG. 11B illustrates that the process of generating the reference signal $C_{ref}(n)$ is implemented with pseudo code using the example of FIG. 11A.

Figure 12A:
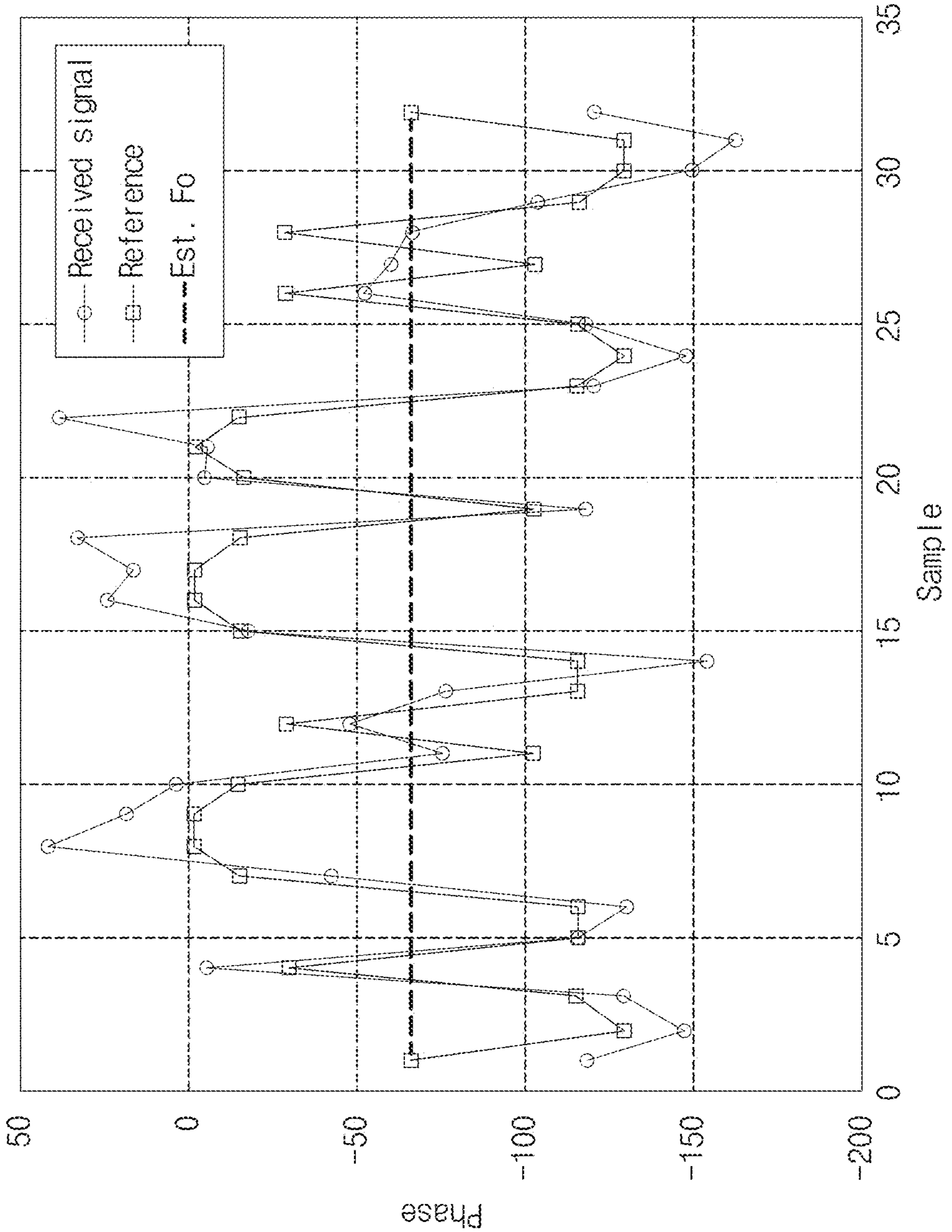
Figure 12B:
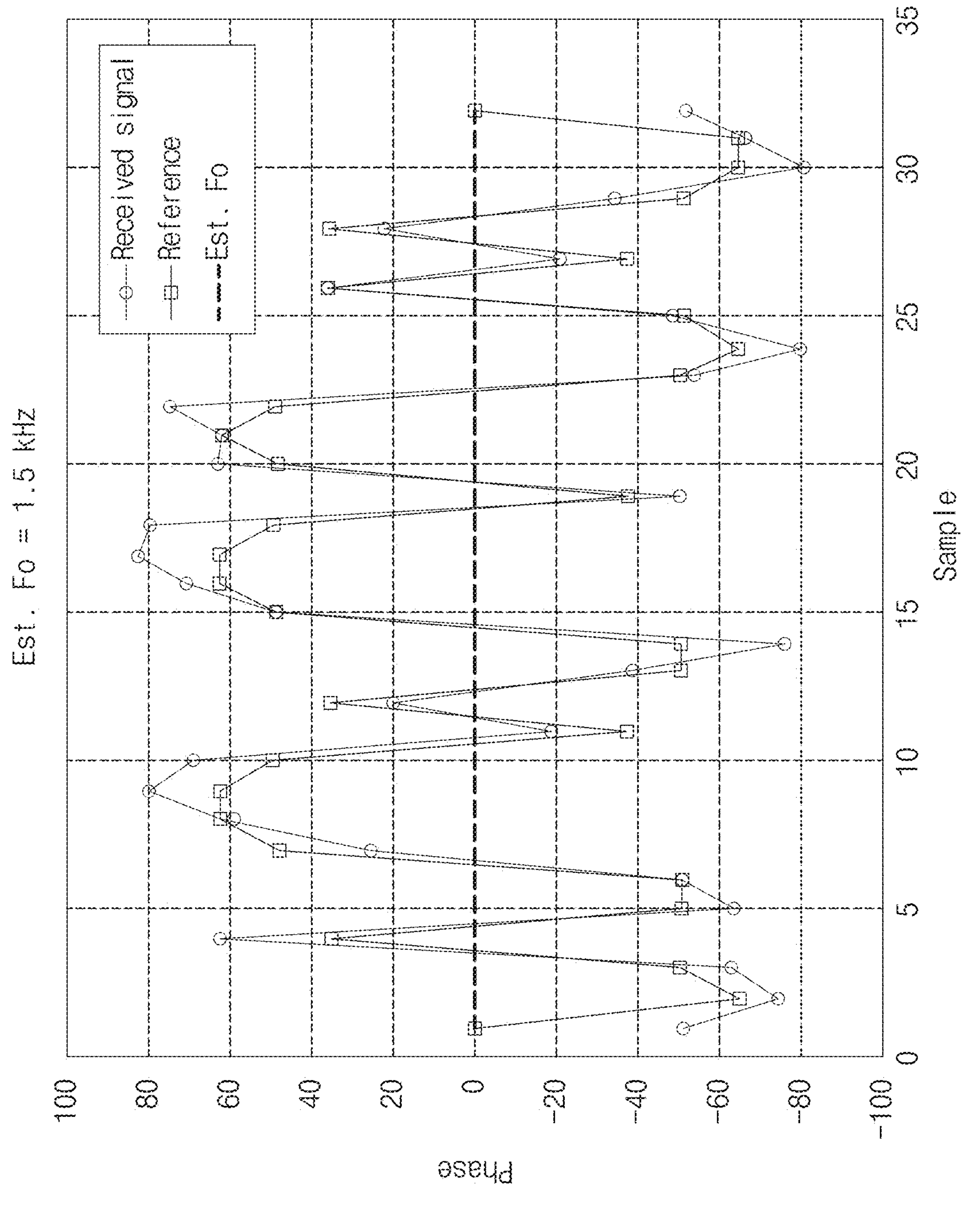

Referring to FIGS. 12A and 12B, the received signal, the reference signal and the estimated frequency offset in the Bluetooth system are illustrated.

Based on the system structure, the reference signal may be generated from the access code transmitted through the upper layer, the frequency error of the received signal stored in the buffer in symbol units may be calculated and compensated, the difference or error between the received signal and the access code (e.g., the symbol error of the received signal) may be calculated, and the synchronization timing may be finally determined. FIG. 12A illustrates an example where the frequency offset is relatively large as about 103.5 kHz, and FIG. 12B illustrates an example where the frequency offset is relatively small as about 1.5 kHz. For example, the frequency offset may be estimated as illustrated in FIG. 12A at the initial operation time, and the frequency offset may be estimated as illustrated in FIG. 12B after the frequency compensation operation is performed. In addition, in FIGS. 12A and 12B, it can be seen that the reference signal has a specific value depending on a pattern of consecutive symbols.

Figure 13:
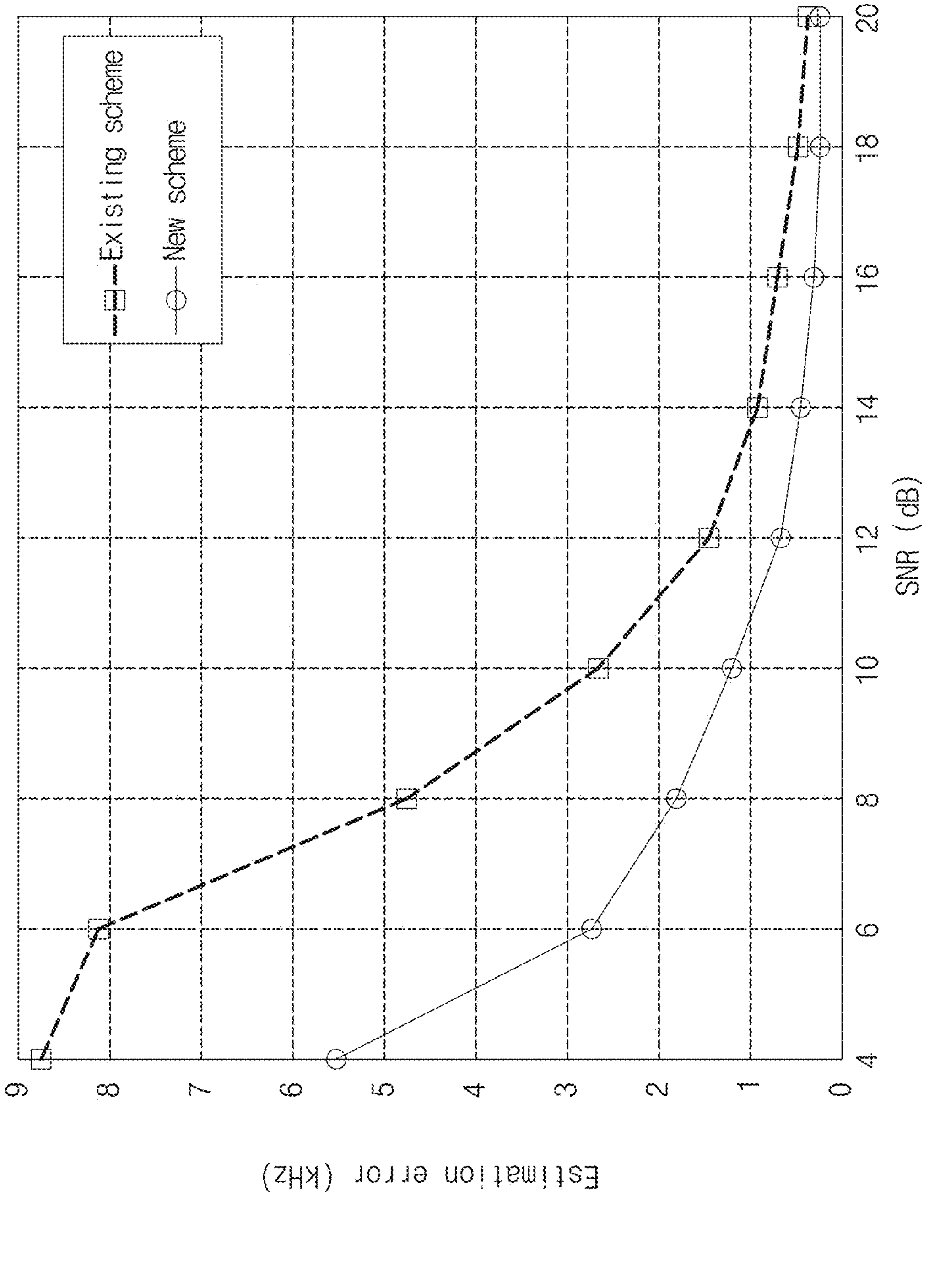

Referring to FIG. 13, performance of an existing scheme (or conventional method) using the zero-crossing scheme and performance of a new scheme (or method) according to some example embodiments are compared with each other.

For example, the accuracy of estimating the frequency offset, which is measured in the basic rate mode of the Bluetooth system, is illustrated depending on a signal-to-noise ratio (SNR). It can be seen that the new scheme provides higher accuracy estimating the frequency offset in all SNR domains than the existing scheme.

The method of performing synchronization and frequency offset estimation and the receiver according to example embodiments may be configured as follows: 1) the generation of the reference signal from the access code or training sequence; 2) the measurement of the frequency error for each over-sampled sample index; 3) the synchronization by compensating the frequency error in frequency domain; and 4) converting the frequency error corresponding to the synchronization timing into the frequency offset and then compensating the signal phase. The frequency offset components of a preamble signal may be efficiently estimated using the reference signal generated by considering modulation characteristics, the performance of the frequency error compensation and the accuracy of the synchronization timing detection may be improved or enhanced, and thus the decoding performance may be improved or enhanced by accurately compensating of the received signal during a normal operation after detecting the synchronization timing and the frequency offset. In some example embodiments, a conventional synchronization method in which the frequency offset is measured depending on the symbol index, is reflected to the received signal in real-time and is compared with the sign bit of the access code or training sequence may be maintained. In addition, in a multi-antenna structure, some example embodiments may be applied for each antenna path or after signal combining depending on a specific criterion.

As will be appreciated by those skilled in the art, some example embodiments may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 14:
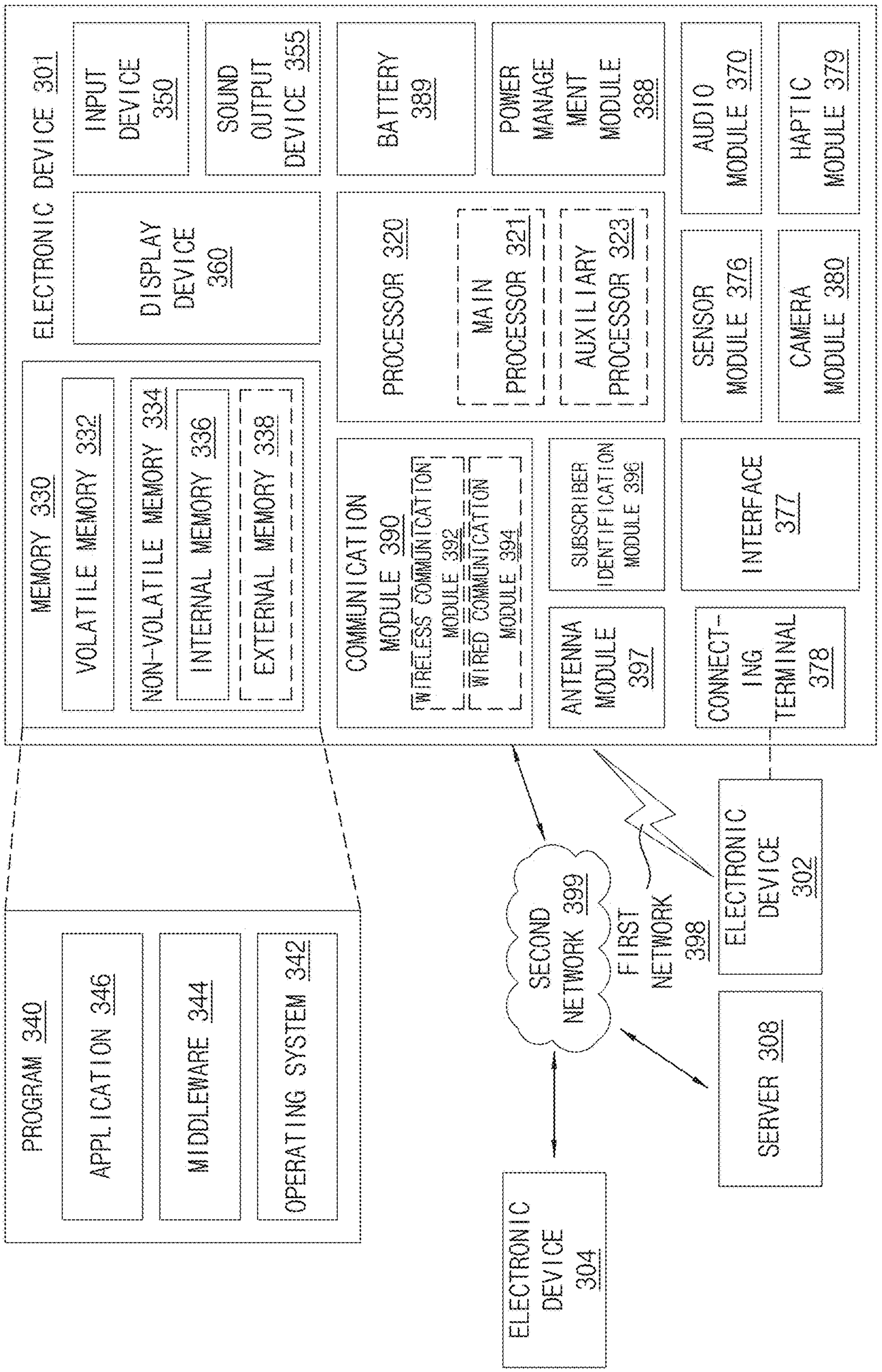
FIG. 14 is a block diagram illustrating an electronic device in a network environment according to some example embodiments.

FIG. 14 is a block diagram illustrating an electronic device in a network environment according to some example embodiments.

Referring to FIG. 14, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). For example, the electronic device 301 may communicate with the electronic device 304 via the server 308. For example, the electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, and/or an antenna module 397. In some example embodiments, at least one (e.g., the display device 360 or the camera module 380) of the components may be omitted from the electronic device 301, or one or more other components may be added in the electronic device 301. In some example embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. For example, as at least part of the data processing or computation, the processor 320 may load a command or data received from another component (e.g., the sensor module 376 or the communication module 390) in a volatile memory 332, process the command or the data stored in the volatile memory 332, and store resulting data in a nonvolatile memory 334. In some example embodiments, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). In some example embodiments, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 and/or the nonvolatile memory 334. The memory 330 may include an internal memory 336 and an external memory 338.

The program 340 may be stored in the memory 330 as software, and may include, for example, an operating system (OS) 342, middleware 344, and/or an application 346.

The input device 350 may receive a command or data to be used by another component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. In some example embodiments, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. In some example embodiments, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. In some example embodiments, the audio module 370 may obtain the sound via the input device 350, or output the sound via the sound output device 355 or a headphone of an external electronic device (e.g., an electronic device 302) directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. In some example embodiments, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor, but example embodiments are not limited thereto.

The interface 377 may support one or more specified protocols to be used for the electronic device 301 to be coupled with the external electronic device (e.g., the electronic device 302) directly (e.g., wired) or wirelessly. In some example embodiments, the interface 377 may include, for example, a high definition multimedia interface (HDMI), a universal serial bus (USB) interface, a secure digital (SD) card interface, and/or an audio interface, but example embodiments are not limited thereto.

A connecting terminal 378 may include a connector via which the electronic device 301 may be physically connected with the external electronic device (e.g., the electronic device 302). In some example embodiments, the connecting terminal 378 may include, for example, a HDMI connector, a USB connector, a SD card connector, and/or an audio connector (e.g., a headphone connector), but example embodiments are not limited thereto.

The haptic module 379 may convert an electrical signal into a mechanical stimulus (e.g., a vibration or a movement) or electrical stimulus which may be recognized by a user via his tactile sensation or kinesthetic sensation. In some example embodiments, the haptic module 379 may include, for example, a motor, a piezoelectric element, and/or an electric stimulator.

The camera module 380 may capture a still image or moving images. In some example embodiments, the camera module 380 may include one or more lenses, image sensors, image signal processors, and/or flashes.

The power management module 388 may manage power supplied to the electronic device 301. In some example embodiments, the power management module 388 may be implemented as at least part of, for example, a power management integrated circuit (PMIC).

The battery 389 may supply power to at least one component of the electronic device 301. In some example embodiments, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. In some example embodiments, the communication module 390 may include a wireless communication module 392 (e.g., a cellular communication module, a short-range wireless communication module, or a global navigation satellite system (GNSS) communication module) and/or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi-components (e.g., multi-chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

In some example embodiments, the wireless communication module 392 included in the communication module 390 may include the transmitter and the receiver included in the wireless communication system according to example embodiments, and may perform the method of performing synchronization and frequency offset estimation according to example embodiments. For example, each of the wireless communication module 392 included in the electronic device 301 and a wireless communication module (not illustrated) included in the electronic device 304 may include the transmitter 100 and the receiver 200 in FIG. 2, and the second network 399 formed between the electronic devices 301 and 304 may correspond to the channel between the transmitter 100 and the receiver 200 in FIG. 2. The receiver 200 included in the electronic device 301 may communicate with the transmitter 100 included in the electronic device 304, and may perform the method of performing synchronization and frequency offset estimation according to example embodiments at the initial operation time. Similarly, the receiver 200 included in the electronic device 304 may communicate with the transmitter 100 included in the electronic device 301, and may perform the method of performing synchronization and frequency offset estimation according to example embodiments at the initial operation time.

The antenna module 397 may transmit or receive a signal or power to or from the outside (e.g., the external electronic device) of the electronic device 301. In some example embodiments, the antenna module 397 may include an antenna including a radiating element composed of a conductive material or a conductive pattern formed in or on a substrate (e.g., PCB). In some example embodiments, the antenna module 397 may include a plurality of antennas. In some example embodiments, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. In some example embodiments, another component (e.g., a radio frequency integrated circuit (RFIC)) other than the radiating element may be additionally formed as part of the antenna module 397.

The example embodiments may be applied to various communication devices and systems and various electronic devices and systems that include the communication devices and systems. For example, the inventive concept may be applied to systems such as a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc., but example embodiments are not limited thereto.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the inventive concepts.

What is claimed is:

1. A method of performing synchronization and frequency offset estimation for an input signal, the method comprising:

receiving an input signal through a wireless channel;

performing a frequency compensation operation on the input signal based on a reference signal to generate a compensated input signal, the reference signal corresponding to an access code associated with the input signal;

calculating a symbol error of the input signal by comparing reference signal with the compensated input signal; and determining a synchronization timing and a frequency offset for the input signal based on the symbol error of the input signal.

2. The method of claim 1, further comprising:

generating the reference signal based on the access code, the reference signal obtained by reflecting inter-symbol interference (ISI) characteristics.

3. The method of claim 2, wherein generating the reference signal includes:

analyzing patterns of a plurality of symbols included in the access code;

calculating ISI components of the access code based on the patterns of the plurality of symbols; and obtaining the reference signal including the ISI components.

4. The method of claim 3, wherein, the plurality of symbols include a first symbol, a second symbol arranged immediately before the first symbol, and a third symbol arranged immediately after the first symbol, the reference signal includes a first reference symbol corresponding to the first symbol, and the first reference symbol is generated based on the first symbol, the second symbol and the third symbol.

5. The method of claim 4, wherein a length of the reference signal is shorter than a length of the access code.

6. The method of claim 3, wherein, the input signal is a signal modulated by a Gaussian frequency shift keying (GFSK) scheme, and the ISI components are generated by a Gaussian filter according to bandwidth-time product (BT) characteristics.

7. The method of claim 1, wherein, the method is performed by an electronic device, the access code is received from a device external to the electronic device, through the wireless channel, and the reference signal is generated by the electronic device based on the access code.

8. The method of claim 1, wherein, the method is performed by an electronic device including a storage unit, and the access code and the reference signal are stored in the storage unit included in the electronic device.

9. The method of claim 1, wherein performing the frequency compensation operation includes:

calculating a frequency error of the input signal based on the reference signal; and performing the frequency compensation operation on the input signal based on the frequency error of the input signal, wherein the frequency error of the input signal is obtained based on a following equation, $$p(n) = \frac{1}{L}\sum_{m=1}^{L-2}(y(n+m) - C_{ref}(m))$$

where p(n) denotes the frequency error of the input signal, L denotes a length of the access code, y(n+m) denotes the input signal, $C_{ref}$(m) denotes the reference signal, and n denotes a symbol index.

10. The method of claim 9, wherein calculating the frequency error of the input signal and performing the frequency compensation operation are performed in real-time while receiving the input signal.

11. The method of claim 1, wherein the synchronization timing and the frequency offset are updated when the symbol error of the input signal is greater than a threshold value by comparing the symbol error of the input signal with the threshold value, and when the symbol error of the input signal is smaller than a minimum error by comparing the symbol error of the input signal with the minimum error.

12. The method of claim 11, wherein the input signal includes a plurality of symbol indices associated with a plurality of symbols, and the symbol error of the input signal is calculated based on a plurality of symbol errors calculated for the plurality of symbol indices.

13. The method of claim 12, wherein determining the synchronization timing and the frequency offset for the input signal includes:

selecting one of the plurality of symbol indices based on the plurality of symbol errors;

selecting a timing corresponding to the selected one of the plurality of symbol indices as the synchronization timing; and selecting an offset corresponding to the selected one of the plurality of symbol indices as the frequency offset.

14. The method of claim 13, wherein a symbol error corresponding to the selected one of the plurality of symbol indices is a smallest symbol error among the plurality of symbol errors.

15. The method of claim 11, wherein the symbol error of the input signal is obtained based on a following equation, $$d(n) = \sum_{m=0}^{M-1}(\text{abs}(\text{sign}(y(n+m) - p(n)) - C_{ACC}(m)))$$

where d(n) denotes the symbol error, y(n+m) denotes the input signal, p(n) denotes a frequency error of the input signal, $C_{ACC}$(m) denotes a symbol value of the access code, and n denotes a symbol index.

16. A receiver device comprising:

a calculator configured to, receive an input signal through a wireless channel, perform a frequency compensation operation on the input signal based on a reference signal to generate a compensated input signal, the reference signal corresponding to an access code associated with the input signal, and calculate a symbol error of the input signal by comparing the reference signal with the compensated input signal; and a detector configured to determine a synchronization timing and a frequency offset for the input signal based on the symbol error of the input signal.

17. The receiver device of claim 16, further comprising a reference signal generator configured to:

generate the reference signal based on the access code, the reference signal obtained by reflecting inter-symbol interference (ISI) characteristics;

analyze patterns of a plurality of symbols included in the access code;

calculate ISI components of the access code based on the patterns of the plurality of symbols; and obtain the reference signal including the ISI components.

18. The receiver device of claim 16, wherein the calculator is configured to:

calculate a frequency error of the input signal based on the reference signal;

perform the frequency compensation operation on the input signal based on the frequency error of the input signal; and calculate the symbol error of the input signal by comparing the reference signal with the input signal.

19. The receiver device of claim 16, wherein, the receiver device is included in a wireless communication system, and the wireless communication system is a Bluetooth system configured to transmit a signal based on Bluetooth short-range wireless communication scheme.

20. A method of performing synchronization and frequency offset estimation for an input signal, the method comprising:

generating a reference signal based on an access code, the reference signal obtained by reflecting inter-symbol interference (ISI) characteristics;

receiving an input signal through a wireless channel, the input signal modulated by a Gaussian frequency shift keying (GFSK) scheme;

calculating a frequency error of the input signal based on the reference signal;

performing a frequency compensation operation on the input signal based on the frequency error of the input signal;

calculating a symbol error of the input signal by comparing the input signal with the reference signal; and determining a synchronization timing and a frequency offset for the input signal based on the symbol error of the input signal, wherein generating the reference signal includes:

analyzing patterns of a plurality of symbols included in the access code;

calculating ISI components of the access code based on the patterns of the plurality of symbols; and obtaining the reference signal including the ISI components, wherein calculating the frequency error of the input signal and performing the frequency compensation operation are performed in real-time while receiving the input signal, wherein determining the synchronization timing and the frequency offset for the input signal includes:

comparing the symbol error of the input signal with a threshold value; and comparing the symbol error of the input signal with a minimum error, and wherein the synchronization timing and the frequency offset are updated when the symbol error of the input signal is greater than the threshold value and when the symbol error of the input signal is smaller than the minimum error.

* * * * *